United States Patent
Kando et al.

(10) Patent No.: US 6,650,607 B1
(45) Date of Patent: Nov. 18, 2003

(54) INFORMATION RECORDING METHOD, INFORMATION RECORDING MEDIUM, AND INFORMATION RECORDING APPARATUS

(75) Inventors: Hidehiko Kando, Matsudo (JP); Takeshi Maeda, Kokubunji (JP); Hiroyuki Minemura, Kokubunji (JP); Tsuyoshi Toda, Kodaira (JP); Yasushi Miyauchi, Akishima (JP); Mitsuhide Miyamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/415,263

(22) Filed: Oct. 12, 1999

(30) Foreign Application Priority Data

| Oct. 12, 1998 | (JP) | 10-289071 |
| Oct. 13, 1998 | (JP) | 10-290282 |
| Nov. 24, 1998 | (JP) | 10-332242 |

(51) Int. Cl.[7] ............................................. G11B 5/76
(52) U.S. Cl. .................................. 369/59.24; 369/47.51
(58) Field of Search .......................... 369/13.24, 13.26, 369/13.27, 47.5, 47.51, 47.52, 53.26, 53.27, 59.11, 59.12, 59.13, 59.23, 59.24, 275.3

(56) References Cited

FOREIGN PATENT DOCUMENTS

| JP | 62-175948 | * | 8/1987 |
| JP | 62-259229 | * | 11/1987 |
| JP | 3-185628 |   | 8/1991 |
| JP | 3-185629 | * | 8/1991 |
| JP | 6-012674 |   | 1/1994 |
| JP | 7-130030 |   | 5/1995 |
| JP | 8-203079 |   | 8/1996 |

OTHER PUBLICATIONS

JIS Standard 120mm DVD–Rewritable Disk (DVD–RAM) JIS × 6243, p. 86, 1998.

* cited by examiner

Primary Examiner—Paul W. Huber
(74) Attorney, Agent, or Firm—Antonelli, Terry, Stout & Kraus, LLP

(57) ABSTRACT

A recording medium in which information is to be recorded is permitted to get into a first state by a first power level of an energy beam and permitted to get into a second state by a second power level higher than the first power level of the energy beam. The information is recorded on the recording medium by moving the energy beam and the recording medium relatively to each other and irradiating the recording medium with the energy beam so that the first and second states are formed with predetermined lengths and at predetermined intervals on the recording medium. Four power levels (first, second, third and fourth power levels) are used as the power level of the energy beam. The information is recorded while the second power level is increased to $\underline{x}$ times and the first, third and fourth power levels are increased to $\underline{y}$ times. The information recorded as described above is reproduced, and reproductive jitter is observed. The magnification factors $\underline{x}$ and $\underline{y}$ are adjusted so that the value of the reproductive jitter is not larger than a predetermined value.

17 Claims, 9 Drawing Sheets

CONFIGURATION OF BASIC RECORDING PATTERN

CONFIGURATION OF RECORDING PATTERNS A1 AND B1

REPRODUCTIVE SIGNAL OF RECORDING PATTERN
A1 AND MEASURED TIME $T_1$

REPRODUCTIVE SIGNAL OF RECORDING PATTERN
B1 AND MEASURED TIME $T_2$

EMBODIMENT 1 OF BASIC RECORDING PATTERN

EMBODIMENT 2 OF BASIC RECORDING PATTERN

FIG. 8

| | | | | | | | | |
|---|---|---|---|---|---|---|---|---|
| [10] | 6 | [6] | 6 | [10] | 9 | [9] | 9 | [9] 14 |
| [10] | 6 | [6] | 5 | [10] | 9 | [9] | 10 | [9] 14 |
| [10] | 6 | [6] | 4 | [10] | 9 | [9] | 11 | [9] 14 |
| [10] | 6 | [6] | 3 | [10] | 9 | [9] | 12 | [9] 14 |
| [10] | 5 | [6] | 6 | [10] | 10 | [9] | 9 | [9] 14 |
| [10] | 5 | [6] | 5 | [10] | 10 | [9] | 10 | [9] 14 |
| [10] | 5 | [6] | 4 | [10] | 10 | [9] | 11 | [9] 14 |
| [10] | 5 | [6] | 3 | [10] | 10 | [9] | 12 | [9] 14 |
| [10] | 4 | [6] | 6 | [10] | 11 | [9] | 9 | [9] 14 |
| [10] | 4 | [6] | 5 | [10] | 11 | [9] | 10 | [9] 14 |
| [10] | 4 | [6] | 4 | [10] | 11 | [9] | 11 | [9] 14 |
| [10] | 4 | [6] | 3 | [10] | 11 | [9] | 12 | [9] 14 |
| [10] | 3 | [6] | 6 | [10] | 12 | [9] | 9 | [9] 14 |
| [10] | 3 | [6] | 5 | [10] | 12 | [9] | 10 | [9] 14 |
| [10] | 3 | [6] | 4 | [10] | 12 | [9] | 11 | [9] 14 |
| [10] | 3 | [6] | 3 | [10] | 12 | [9] | 12 | [9] 14 |

FIG. 9

| | | | | | | | | |
|---|---|---|---|---|---|---|---|---|
| [10] | 6 | [5] | 6 | [10] | 9 | [9] | 9 | [9] 13 |
| [10] | 6 | [5] | 5 | [10] | 9 | [9] | 10 | [9] 13 |
| [10] | 6 | [5] | 4 | [10] | 9 | [9] | 11 | [9] 13 |
| [10] | 6 | [5] | 3 | [10] | 9 | [9] | 12 | [9] 13 |
| [10] | 5 | [5] | 6 | [10] | 10 | [9] | 9 | [9] 13 |
| [10] | 5 | [5] | 5 | [10] | 10 | [9] | 10 | [9] 13 |
| [10] | 5 | [5] | 4 | [10] | 10 | [9] | 11 | [9] 13 |
| [10] | 5 | [5] | 3 | [10] | 10 | [9] | 12 | [9] 13 |
| [10] | 4 | [5] | 6 | [10] | 11 | [9] | 9 | [9] 13 |
| [10] | 4 | [5] | 5 | [10] | 11 | [9] | 10 | [9] 13 |
| [10] | 4 | [5] | 4 | [10] | 11 | [9] | 11 | [9] 13 |
| [10] | 4 | [5] | 3 | [10] | 11 | [9] | 12 | [9] 13 |
| [10] | 3 | [5] | 6 | [10] | 12 | [9] | 9 | [9] 13 |
| [10] | 3 | [5] | 5 | [10] | 12 | [9] | 10 | [9] 13 |
| [10] | 3 | [5] | 4 | [10] | 12 | [9] | 11 | [9] 13 |
| [10] | 3 | [5] | 3 | [10] | 12 | [9] | 12 | [9] 13 |

FIG. 10

| | | | | | | | | |
|---|---|---|---|---|---|---|---|---|
| 10 | 6 | 4 | 6 | 10 | 9 | 9 | 9 | 12 |
| 10 | 6 | 4 | 5 | 10 | 9 | 9 | 10 | 9 | 12 |

| | | | | | | | | |
|---|---|---|---|---|---|---|---|---|
| 10 | 6 | 4 | 6 | 10 | 9 | 9 | 9 | 12 |
| 10 | 6 | 4 | 5 | 10 | 9 | 10 | 9 | 12 |
| 10 | 6 | 4 | 4 | 10 | 9 | 11 | 9 | 12 |
| 10 | 6 | 4 | 3 | 10 | 9 | 12 | 9 | 12 |
| 10 | 5 | 4 | 6 | 10 | 10 | 9 | 9 | 12 |
| 10 | 5 | 4 | 5 | 10 | 10 | 10 | 9 | 12 |
| 10 | 5 | 4 | 4 | 10 | 10 | 11 | 9 | 12 |
| 10 | 5 | 4 | 3 | 10 | 10 | 12 | 9 | 12 |
| 10 | 4 | 4 | 6 | 10 | 11 | 9 | 9 | 12 |
| 10 | 4 | 4 | 5 | 10 | 11 | 10 | 9 | 12 |
| 10 | 4 | 4 | 4 | 10 | 11 | 11 | 9 | 12 |
| 10 | 4 | 4 | 3 | 10 | 11 | 12 | 9 | 12 |
| 10 | 3 | 4 | 6 | 10 | 12 | 9 | 9 | 12 |
| 10 | 3 | 4 | 5 | 10 | 12 | 10 | 9 | 12 |
| 10 | 3 | 4 | 4 | 10 | 12 | 11 | 9 | 12 |
| 10 | 3 | 4 | 3 | 10 | 12 | 12 | 9 | 12 |

FIG. 11

| | | | | | | | | |
|---|---|---|---|---|---|---|---|---|
| 10 | 6 | 3 | 6 | 10 | 9 | 9 | 9 | 11 |
| 10 | 6 | 3 | 5 | 10 | 9 | 10 | 9 | 11 |
| 10 | 6 | 3 | 4 | 10 | 9 | 11 | 9 | 11 |
| 10 | 6 | 3 | 3 | 10 | 9 | 12 | 9 | 11 |
| 10 | 5 | 3 | 6 | 10 | 10 | 9 | 9 | 11 |
| 10 | 5 | 3 | 5 | 10 | 10 | 10 | 9 | 11 |
| 10 | 5 | 3 | 4 | 10 | 10 | 11 | 9 | 11 |
| 10 | 5 | 3 | 3 | 10 | 10 | 12 | 9 | 11 |
| 10 | 4 | 3 | 6 | 10 | 11 | 9 | 9 | 11 |
| 10 | 4 | 3 | 5 | 10 | 11 | 10 | 9 | 11 |
| 10 | 4 | 3 | 4 | 10 | 11 | 11 | 9 | 11 |
| 10 | 4 | 3 | 3 | 10 | 11 | 12 | 9 | 11 |
| 10 | 3 | 3 | 6 | 10 | 12 | 9 | 9 | 11 |
| 10 | 3 | 3 | 5 | 10 | 12 | 10 | 9 | 11 |
| 10 | 3 | 3 | 4 | 10 | 12 | 11 | 9 | 11 |
| 10 | 3 | 3 | 3 | 10 | 12 | 12 | 9 | 11 |

INFORMATION RECORDING METHOD, INFORMATION RECORDING MEDIUM, AND INFORMATION RECORDING APPARATUS

BACKGROUND OF THE INVENTION

1. Field of the Invention

The present invention relates to an information recording method, an information recording medium and an information recording apparatus, using a recording medium in which information can be recorded by energy beam irradiation. Particularly, it relates to an information recording method having an excellent effect on a phase-change optical disk, an information recording medium, and an information recording apparatus using the information recording method.

2. Description of the Related Art

In the case of using, for example, such a photomagnetic disk as described in JP-A-62-175948 having a switched connection two-layer film as a recording film, or in the case of using, for example, such a high-speed erasable recording film for a phase-change optical disk as described in JP-A-62-259229 capable of performing crystallization in almost the same time as laser irradiation time for recording, a conventional recording/erasing method on a rewritable recording film is carried out by changing a power level of an energy beam between at least two power levels (that is, at least a high power level and an intermediate power level) which are higher than a read power level. The conventional method has an advantage in that new information can be recorded while existing information is erased, that is, overwriting (rewriting owing to overwriting) can be made. Further, such a phenomenon that a recording mark is shaped like a teardrop (a rear portion of a recording mark becomes wider than a front portion of the recording mark) can be suppressed by changing a power level of an energy beam among three power levels consisting of a high power level, an intermediate power level and a low power level lower than the intermediate power level as described in JP-A-62-259229 and JP-A-3-185629.

On the other hand, recently, a DVD-RAM using a phase-change material to achieve a memory capacity of 2.6 GB per side in a 120 mm-diameter disk has been put into practical use. A recording control method used in the DVD-RAM is described in JIS Standard, JIS X 6243 for 120 mm DVDRwritable Disk (DVD-RAM) (hereinafter referred to as "Standard Book JIS X 6243"), page 86. Control based on the aforementioned three power levels is described in the standard book.

Researches into improvement of the density of a rewritable digital video disk (DVD-RAM) using a phase-change recording film are in progress. In an optical disk device such as a DVD-RAM in which mark edge recording is performed in a phase-change recording film, both attained temperature and cooling speed in a recording mode need to be made substantially uniform in every place of an outer edge portion of a recording-film fused region for forming recording marks in the recording film in order to prevent both mark shape distortion and incomplete erasure. However, in various types of known recording waveforms, it is impossible to satisfy the condition sufficiently. Accordingly, there is a limitation in realizable recording density. Further, recording characteristic of a recording medium usually varies according to the producer, production time and lot of the recording medium. Accordingly, there is a tendency for recording compatibility to be more hardly secured as higher-density recording is intended.

Particularly, in a DVD-RAM with a memory capacity of 4.7 GB higher in density than the DVD-RAM with a memory capacity of 2.6 GB, recording is performed with the same spot diameter as that in the 2.6 GB DVD-RAM so that the compatibility with 2.6 GB DVD-RAM can be kept easily. However, when linear density is increased while the spot diameter is kept constant, the distance between positions irradiated on a recording medium by two recording pulses adjacent to each other is reduced compared with the light spot diameter of laser light on the recording medium. Accordingly, light distributions overlap each other compared with the 2.6 GB DVD-RAM, so that it is necessary to prevent the recording mark shape from being distorted due to the overlapping of light distributions. Therefore, it is thought of that more complicated modulated recording waveform control is used to increase the number of power levels so as to change the energy beam among four power levels. In such a complicated recording waveform, good-shape recording marks can be formed if appropriate setting is performed. Increase of the number of energy levels, however, brings about a problem of how to optimize the respective energy levels. That is, when the respective energy levels are set appropriately, good recording marks having little recording mark shape distortion can be formed. But, there is a problem that the procedure of optimizing the energy levels is complicated because energy balance becomes delicate and the number of energy levels is large (first problem).

In the conventional recording/erasing method applied to the rewritable recording film as described in the aforementioned Standard Book JIS X 6243, page 86, the control on the basis of the aforementioned three power levels is described. The recording power levels used in the recording mode are written in a control data area on the disk. The information recording apparatus sets the recording power levels by reading the recording power levels written on the disk. The absolute values of the recording power levels, however, may change due to the individual difference of the information recording apparatus, or due to the environmental change or aging of the information recording apparatus. In most cases, therefore, the recording power levels are checked or adjusted before information is written in the disk actually. That is, while Peak Power is changed in a condition that Bias Power 1 and Bias Power 2 given to the control data area are fixed, a random pattern is recorded and then reproduced to measure reproductive jitter. The recording power level to make the value of reproductive jitter equal to a predetermined value is multiplied by a predetermined factor so that a recording power level is obtained. The recording power level obtained thus is set as new Peak Power. Then, while Bias Power 1 is changed, the random pattern is recorded and then reproduced to measure the reproductive jitter. The bias power to minimize the value of the reproductive jitter is set as new Bias Power 1.

In a phase-change recording medium of a 120 mm diameter with a larger capacity than 2.6 GB per side (for example, a DVD-RAM with a diameter of 120 mm intended to achieve a capacity of 4.7 GB per side), accurate information recording may be performed by adaptively changing the timing of leading and trailing edge portions of a recording pulse in accordance with the combination of recording patterns to be recorded. It is thought of that such timing information is recorded in the control data area on the disk so that the information recording apparatus reads the timing information to use it for actual recording.

The information recording apparatus does not always have the same recording characteristic. The recording characteristic may change due to the individual difference of the information recording apparatus, or due to the aging or environmental change of the information recording apparatus. Accordingly, it may be impossible to perform appropriate recording on the basis of the timing information written on the disk. In such a case, the reproductive jitter at the time of recording/reproducing the random pattern becomes worse than the expected value. As a result, if the recording power levels are determined on the basis of the jitter of the random pattern in the same manner as that in the prior art, there is a possibility that the recording power levels may be set to unsuitable values. If the recording is performed on the basis of the unsuitable recording power levels, there is a fear of reduction in reliability of recording/reproducing, for example, the recording becomes unstable, the already written information is erased due to cross-erasure, and so on (second problem).

Further, as described above, in the DVD-RAM with the recording capacity of 4.7 GB which is higher in density than the 2.6 GB DVD-RAM, the recording can be performed with the same spot diameter as that in the 2.6 GB DVD-RAM so that the compatibility with the 2.6 GB DVD-RAM can be obtained. However, when the linear density is made high while the spot diameter is kept unchanged, the distance between two positions on the recording medium irradiated with two adjacent recording pulses is reduced compared with the light spot diameter of laser light on the recording medium. For this reason, the light distributions overlap each other compared with the case of 2.6 GB, so that it is necessary to prevent the recording mark shape distortion due to the overlapping of the light distributions.

Further, when the space between the recording marks is short, the recording marks cannot be resolved by the reading light spot, so that the shifting of the recording mark edge position occurs in the reproductive signal waveform. Accordingly, it is also necessary to prevent the recording mark edge position from shifting. For this reason, an attempt has been made to reduce the shifting of the recording mark edge position by changing the irradiation timing of the recording pulses according to the length of a mark to be written and the length of a portion (hereinafter referred to as "space") between marks. However, when high-density recording is to be performed by use of the phase-change medium such as a DVD-RAM with the recording capacity of 4.7 GB, there is a problem that the procedure for determining the irradiation timing of the recording pulses in detail is not always clear (third problem).

SUMMARY OF THE INVENTION

A first object of the present invention is to solve the aforementioned first problem, that is, to provide an information recording method and an information recording apparatus in which the accurate recording can be performed to improve density more greatly by use of the same spot diameter as that in the prior art while the compatibility with the prior art is kept. Particularly, the first object of the present invention is to provide an information recording method in which four energy levels for use in forming recording marks are selected easily and accurately, and to provide an information recording apparatus using the information recording method.

A second object of the present invention is to solve the aforementioned second problem, that is, to provide an information recording method and an information recording apparatus in which such unsuitable recording power levels as mentioned above are prevented from being set so that the stable recording/reproducing can be normally performed.

A third object of the present invention is to solve the aforementioned third problem, that is, to provide an information recording method, an information recording medium and an information recording apparatus in which the accurate recording can be performed to improve the density more greatly by use of the same spot diameter as that in the prior art while the compatibility with the prior art is kept. Particularly, the third object of the present invention is to provide a procedure for accurate measuring the irradiation timing of the recording pulse and a procedure for determining the optimum irradiation timing, an information recording apparatus using the measuring and determining procedures of the irradiation timing, and an information recording medium in which the irradiation timing determined using the measuring and determining procedures of the irradiation timing are recorded as fixed information.

To solve the aforementioned first problem, the following information recording method and apparatus may be used.

(1) An information recording method using a recording medium permitted to get into a first state by a first power level of an energy beam and permitted to get into a second state by a second power level of the energy beam higher than the first power level, for recording information on the recording medium by moving the energy beam and the recording medium relatively to each other so that the recording medium is irradiated with the energy beam and the first and second states are formed on the recording medium with predetermined lengths and at predetermined intervals, comprising the steps of:

providing a third power level equal to or less than the first power level;

making a period of the third power level coexistent with a period of the second power level to multi-pulsate the energy beam and irradiating the recording medium with the multi-pulsated energy beam when a region of the second state is formed in the recording medium so that the region of the second state has a specific length;

providing a fourth power level equal to or less than the first power level;

irradiating the recording medium with the fourth power level of the energy beam for a predetermined period following the last pulse of the multi-pulsated energy beam;

multiplying the second power level by a magnification factor $\underline{x}$ to thereby obtain a new second power level;

multiplying the first power level by a magnification factor $\underline{y}$ to thereby obtain a new first power level;

multiplying the third power level by the magnification factor $\underline{y}$ to thereby obtain a new third power level;

multiplying the fourth power level by the magnification factor $\underline{y}$ to thereby obtain a new fourth power level;

recording information on the recording medium with changing values of the magnification factors $\underline{x}$ and $\underline{y}$ variously, and reproducing the recorded information to thereby obtain a reproductive signal; and adjusting the values of the magnification factors $\underline{x}$ and $\underline{y}$ so that a value of reproductive jitter of the reproductive signal is less than a predetermined value.

(2) An information recording method using a recording medium permitted to get into a first state by a first power level of an energy beam and permitted to get into a second state by a second power level of the energy beam higher than the first power level, for recording information on the recording medium by moving the energy beam and the recording medium relatively to each other so that the recording medium is irradiated with the energy beam and the first and second states are formed on the recording medium with predetermined lengths and at predetermined intervals, comprising the steps of:

providing a third power level equal to or less than the first power level;

making a period of the third power level coexistent with a period of the second power level to multi-pulsate the energy beam and irradiating the recording medium with the multi-pulsated energy beam when a region of the second state is formed in the recording medium so that the region of the second state has a specific length;

providing a fourth power level equal to or less than the first power level;

irradiating the recording medium with the fourth power level of the energy beam for a predetermined period following the last pulse of the multi-pulsated energy beam;

multiplying the first power level by a magnification factor $z$ to thereby obtain a new first power level;

multiplying the second power level by the magnification factor $z$ to thereby obtain a new second power level;

multiplying the third power level by the magnification factor $z$ to thereby obtain a new third power level;

multiplying the fourth power level by the magnification factor $z$ to thereby obtain a new fourth power level;

recording information on the recording medium while changing values of the magnification factor $z$ variously, and reproducing the recorded information to thereby obtain a reproductive signal; and adjusting the value of the magnification factor $z$ so that a value of reproductive jitter of the reproductive signal is less than a predetermined value.

(3) An information recording apparatus comprising:

an energy beam generator for generating an energy beam;

a power adjusting mechanism for setting a power level of the energy beam to a first power level and a second power level which is higher than the first power level;

a holding mechanism for holding a recording medium permitted to get into a first state by the first power level and permitted to get into a second state by the second power level;

a moving mechanism for moving the energy beam and the recording medium relatively to each other;

a positioning mechanism for irradiating a predetermined place of the recording medium with the energy beam; and a signal processing circuit for changing information to be recorded, into the power levels of the energy beam;

the power adjusting mechanism including:

a function of making a period of a third power level coexistent with a period of the second power level to thereby multi-pulsate the energy beam when a region of the second state is formed in the recording medium so that the region of the second state has a specific length, the third power level being equal to or less than the first power level;

a function of irradiating the recording medium with the energy beam of a fourth power level for a predetermined period following a last pulse of the multi-pulsated energy beam, the fourth power level being equal to or less than the first power level;

a function of setting the second power level multiplied by a magnification factor $x$ to a new second power level;

a function of setting the first power level multiplied by a magnification factor $y$ to a new first power level;

a function of setting the third power level multiplied by the magnification factor $y$ to a new third power level; and a function of setting the fourth power level multiplied by the magnification factor $y$ to a new fourth power level; and the information apparatus further comprises:

means for forming the first and second states on the recording medium by irradiating the recording medium with the energy beam while changing values of the magnification factors $x$ and $y$ variously;

a time interval measuring circuit for measuring fluctuation of a reproductive signal obtained by reproducing the first and second states; and a controller for adjusting the values of the magnification factors $x$ and $y$ so that the value of the fluctuation of the reproductive signal obtained by the time interval measuring circuit is less than a predetermined value.

(4) An information recording apparatus comprising:

an energy beam generator for generating an energy beam;

a power adjusting mechanism for setting a power level of the energy beam to a first power level and a second power level which is higher than the first power level;

a holding mechanism for holding a recording medium permitted to get into a first state by the first power level and permitted to get into a second state by the second power level;

a moving mechanism for moving the energy beam and the recording medium relatively to each other;

a positioning mechanism for irradiating a predetermined place of the recording medium with the energy beam; and a signal processing circuit for changing information to be recorded, into the power levels of the energy beam;

the power adjusting mechanism including:

a function of making a period of a third power level coexistent with a period of the second power level to thereby multi-pulsate the energy beam when a region of the second state is formed in the recording medium so that the region of the second state has a specific length, the third power level being equal to or less than the first power level;

a function of irradiating the recording medium with the energy beam of a fourth power level for a predetermined period following a last pulse of the multi-pulsated energy beam, the fourth power level being equal to or less than the first power level;

a function of setting the first power level multiplied by a magnification factor $z$ to a new first power level;

a function of setting the second power level multiplied by the magnification factor $z$ to a new second power level;

a function of setting the third power level multiplied by the magnification factor z to a new third power level; and a function of setting the fourth power level multiplied by the magnification factor z to a new fourth power level; and the information apparatus further comprises:

means for forming the first and second states on the recording medium by irradiating the recording medium with the energy beam while changing a value of the magnification factors z variously;

a time interval measuring circuit for measuring fluctuation of a reproductive signal obtained by reproducing the first and second states; and a controller for adjusting the value of the magnification factor z so that the value of the fluctuation of the reproductive signal obtained by the time interval measuring circuit is less than a predetermined value.

To solve the aforementioned second problem, the following information recording method and apparatus may be used.

(1) An information recording method using a recording medium permitted to get into a first state by a first power level of an energy beam and permitted to get into a second state by a second power level of the energy beam higher than the first power level, for recording information on the recording medium by forming the first and second states with predetermined lengths and at predetermined intervals on the recording medium by changing a power level of the energy beam among a plurality of power levels including the first and second power levels according to information to be recorded while moving the energy beam and the recording medium relatively to each other so that the recording medium is irradiated with the energy beam to thereby form a pulse string of the energy beam, the method comprising the steps of:

optimizing the first power level while fixing the second power level to a suitable initial value; and optimizing the second power level while fixing the first power level to the optimized value.

(2) An information recording method using a recording medium permitted to get into a first state by a first power level of an energy beam and permitted to get into a second state by a second power level of the energy beam higher than the first power level, for recording information in the recording medium by forming the first and second states with predetermined lengths and at predetermined intervals on the recording medium by changing the energy level among a plurality of power levels including the first and second power levels according to information to be recorded while moving the energy beam and the recording medium relatively to each other so that the recording medium is irradiated with the energy beam to thereby form a pulse string of the energy beam, the method comprising:

at least one of a first timing adjusting method for adjusting a timing of a pulse of the energy beam which corresponds to a head portion of the second state to be formed on the recording medium, and a second timing adjusting method for adjusting a timing of a pulse of the energy beam which corresponds to a tail portion of the second state to be formed on the recording medium; and at least one of a first adjusting procedure for adjusting the timings according to the first and second timing adjusting methods after optimizing the power levels by the information recording method described in (1), and a second adjusting procedure for optimizing the power levels by the information recording method described in (1) after adjusting the timings according to the first and second timing adjusting methods.

(3) An information recording apparatus comprising:

an energy beam generator for generating an energy beam;

a power adjusting mechanism for setting a power level of the energy beam to a first power level and a second power level which is higher than the first power level;

a holding mechanism for holding a recording medium permitted to get into a first state by the first power level and permitted to get into a second state by the second power level;

a moving mechanism for moving the energy beam and the recording medium relatively to each other;

a positioning mechanism for irradiating a predetermined place of the recording medium with the energy beam;

a signal processing circuit for changing information to be recorded into the power levels of the energy beam;

means of optimizing the first power level while fixing the second power level to a suitable initial value and then optimizing the second power level while fixing the first power level to the optimized value to thereby set the power levels in a recording mode.

(4) An information recording apparatus comprising:

an energy beam generator for generating an energy beam;

a power adjusting mechanism for setting a power level of the energy beam to a first power level and a second power level which is higher than the first power level;

a holding mechanism for holding a recording medium permitted to get into a first state by the first power level and permitted to get into a second state by the second power level;

a moving mechanism for moving the energy beam and the recording medium relatively to each other;

a positioning mechanism for irradiating a predetermined place of the recording medium with the energy beam;

a signal processing circuit for changing information to be recorded into the power levels of the energy beam;

at least one of first and second timing adjusting means, the first timing adjusting means adjusting a timing of a pulse of the energy beam corresponding to a head portion of the second state to be formed on the recording medium, and the second timing adjusting means adjusting a timing of a pulse of the energy beam corresponding to a tail portion of the second state to be formed on the recording medium; and at least one of third and fourth timing adjusting means, the third timing adjusting means performing timing adjustment in the first and second timing adjusting means after optimizing the power levels by the optimization means according to claim 15, and the fourth timing adjusting means optimizing the power levels by the optimizing means according to claim 15 after performing the timing adjustment in the first and second timing adjusting means.

To solve the aforementioned third problem, the following information recording method and apparatus may be used.

(1) An information recording method using a recording medium permitted to get into a first state by a first power level of an energy beam and permitted to get into a second state by a second power level of the energy beam higher than the first power level, for recording information on the recording medium by moving the energy beam and the recording medium relatively to each other so that the recording medium is irradiated with the energy beam and the first and second states are formed on the recording medium with predetermined lengths and at predetermined intervals, comprising the steps of:

when a period of a recording timing generating clock in a recording mode is T, and a relative velocity of the energy beam and the recording medium is v, forming a sequence of the second state with length avT (first mark), the first state with length ivT (first space) following the first mark, the second state with length mvT (second mark) following the first space, the first state with length jvT (second space) following the second mark and the second state with length bvT (third mark) following the second space as a first small recording pattern;

forming a sequence which starts with the first state and ends with the first state while the first and second states appear alternately by a finite number of times, as a second small recording pattern;

forming a state in which the second small recording pattern follows the first small recording pattern, as a basic recording pattern;

forming a state in which the basic recording patterns are repeated, as a recording pattern;

forming the recording pattern which comprises the basic recording patterns obtained by changing a parameter $j$ variously while parameters $a$, $i$ and $m$ are fixed, as a first recording pattern, the parameters $a$, $i$, $m$ and $j$ being natural numbers;

forming the recording pattern which comprises the basic recording patterns obtained by changing the parameter $i$ variously while a parameter $b$ and the parameters $j$ and $m$ are fixed, as a second recording pattern, the parameter $b$ being a natural number; and using at least one of first and second edge position measuring methods, wherein:

the first edge position measuring method estimates a position of a boundary between the second mark and the first space by comparing a time interval from time corresponding to a mark edge position opposite to the first space of the first mark in a read signal of the first recording pattern to time corresponding to the position of the boundary between the second mark and the first space in the read signal with a time interval of $(a+i)T$; and the second edge position measuring method estimates a position of a boundary between the second mark and the second space by comparing a time interval from time corresponding to the position of the boundary between the second mark and the second space in a read signal of the second recording pattern to time corresponding to a mark edge position opposite to the second space of the third mark in the read signal with a time interval of $(b+i)T$.

(2) An information recording method using a recording medium permitted to get into a first state by a first power level of an energy beam and permitted to get into a second state by a second power level of the energy beam higher than the first power level, for recording information on the recording medium by moving the energy beam and the recording medium relatively to each other so that the recording medium is irradiated with the energy beam and the first and second states are formed on the recording medium with predetermined lengths and at predetermined intervals, comprising the steps of:

when a period of a recording timing generating clock in a recording mode is T, and a relative velocity of the energy beam and the recording medium is v, forming a sequence of the second state with length avT (first mark), the first state with length ivT (first space) following the first mark, the second state with length mvT (second mark) following the first space, the first state with length jvT (second space) following the second mark and the second state with length bvT (third mark) following the second space as a first small recording pattern;

forming a sequence which starts with the first state and ends with the first state while the first and second states appear alternately by a finite number of times, as a second small recording pattern;

forming a state in which the second small recording pattern follows the first small recording pattern, as a basic recording pattern;

forming a state in which the basic recording patterns are repeated, as a recording pattern;

forming the recording pattern which comprises the basic recording patterns obtained by changing a parameter $j$ variously while parameters $a$, $i$ and $m$ are fixed, as a first recording pattern, the parameters $a$, $i$, $m$ and $j$ being natural numbers;

forming the recording pattern which comprises the basic recording patterns obtained by changing the parameter $i$ variously while a parameter $b$ and the parameters $j$ and $m$ are fixed, as a second recording pattern, the parameter $b$ being a natural number;

using at least one of first and second edge position measuring methods; and using at least one of first and second timing adjusting methods, wherein the first edge position measuring method estimates a position of a boundary between the second mark and the first space by comparing a time interval from time corresponding to a mark edge position opposite to the first space of the first mark in a read signal of the first recording pattern to time corresponding to the position of the boundary between the second mark and the first space in the read signal with a time interval of $(a+i)T$;

the second edge position measuring method estimates a position of a boundary between the second mark and the second space by comparing a time interval from time corresponding to the position of the boundary between the second mark and the second space in a read signal of the second recording pattern to time corresponding to a mark edge position opposite to the second space of the third mark in the read signal with a time interval of $(b+i)T$;

the first timing adjusting method changes timing for making the energy beam reach the second power level in accordance with a combination of the respective lengths of the first and second states to be formed on the recording medium; and the second timing adjusting method changes timing for shifting the energy beam from the second power level to another energy level in accordance with a combination of the respective lengths of the second and first states to be formed on the recording medium.

(3) An information recording method using a recording medium permitted to get into a first state by a first power level of an energy beam and permitted to get into a second state by a second power level of the energy beam higher than the first power level, for recording information on the recording medium by moving the energy beam and the recording medium relatively to each other so that the recording medium is irradiated with the energy beam and the first and second states are formed on the recording medium with predetermined lengths and at predetermined intervals, comprising the steps of:

when a period of a recording timing generating clock in a recording mode is T, and a relative velocity of the energy beam and the recording medium is v, forming a sequence of the second state with length avT (first mark), the first state with length ivT (first space) following the first mark, the second state with length mvT (second mark) following the first space, the first state with length jvT (second space) following the second mark and the second state with length bvT (third mark) following the second space as a first small recording pattern;

forming a sequence which starts with the first state and ends with the first state while the first and second states appear alternately by a finite number of times, as a second small recording pattern;

forming a state in which the second small recording pattern follows the first small recording pattern, as a basic recording pattern;

forming a state in which the basic recording patterns are repeated, as a recording pattern;

forming the recording pattern which comprises the basic recording patterns obtained by changing a parameter j variously while parameters a, i and m are fixed, as a first recording pattern, the parameters a, i, m and j being natural numbers;

forming the recording pattern which comprises the basic recording patterns obtained by changing the parameter i variously while a parameter b and the parameters j and m are fixed, as a second recording pattern, the parameter b being a natural number;

using at least one of first and second edge position measuring methods;

using at least one of first and second timing adjusting methods; and using at least one of first and second timing correcting methods, wherein the first edge position measuring method estimates a position of a boundary between the second mark and the first space by comparing a time interval from time corresponding to a mark edge position opposite to the first space of the first mark in a read signal of the first recording pattern to time corresponding to the position of the boundary between the second mark and the first space in the read signal with a time interval of (a+i)T;

the second edge position measuring method estimates a position of a boundary between the second mark and the second space by comparing a time interval from time corresponding to the position of the boundary between the second mark and the second space in a read signal of the second recording pattern to time corresponding to a mark edge position opposite to the second space of the third mark in the read signal with a time interval of (b+i)T;

the first timing adjusting method changes timing for making the energy beam reach the second power level in accordance with a combination of the respective lengths of the first and second states to be formed on the recording medium;

the second timing adjusting method changes timing for shifting the energy beam from the second power level to another energy level in accordance with a combination of the respective lengths of the second and first states to be formed on the recording medium;

the first timing correcting method adjusts the timing in the first timing adjusting method based on a result of the first edge position measuring method; and the second timing correcting method adjusts the timing in the second timing adjusting method based on a result of the second edge position measuring method.

(4) An information recording method using a recording medium permitted to get into a first state by a first power level of an energy beam and permitted to get into a second state by a second power level of the energy beam higher than the first power level, for recording information on the recording medium by moving the energy beam and the recording medium relatively to each other so that the recording medium is irradiated with the energy beam and the first and second states are formed on the recording medium with predetermined lengths and at predetermined intervals, comprising the steps of:

when a period of a recording timing generating clock in a recording mode is T, and a relative velocity of the energy beam and the recording medium is v, forming a sequence of the second state with length avT (first mark), the first state with length ivT (first space) following the first mark, the second state with length mvT (second mark) following the first space, the first state with length jvT (second space) following the second mark and the second state with length bvT (third mark) following the second space as a first small recording pattern;

forming a sequence which starts with the first state and ends with the first state while the first and second states appear alternately by a finite number of times, as a second small recording pattern;

forming a state in which the second small recording pattern follows the first small recording pattern, as a basic recording pattern;

forming a state in which the basic recording patterns are repeated, as a recording pattern;

forming the recording pattern which comprises the basic recording patterns obtained by changing a parameter j variously while parameters a, i and m are fixed, as a first recording pattern, the parameters a, i, m and j being natural numbers;

forming the recording pattern which comprises the basic recording patterns obtained by changing the parameter i variously while a parameter b and the parameters j and m are fixed, as a second recording pattern, the parameter b being a natural number;

using at least one of first and second edge position measuring methods;

using at least one of first and second timing adjusting methods; and using at least one of first and second timing correcting methods, wherein the first edge position measuring method estimates a position of a boundary between the second mark and the first space by comparing a time interval from time corresponding to a mark edge position opposite to the first space of the first mark in a read signal of the first recording pattern to time corresponding to the position of the boundary between the second mark and the first space in the read signal with a time interval of (a+i)T;

the second edge position measuring method estimates a position of a boundary between the second mark and the second space by comparing a time interval from time corresponding to the position of the boundary between the second mark and the second space in a read signal of the second recording pattern to time corresponding to a mark edge position opposite to the second space of the third mark in the read signal with a time interval of (b+i)T;

the first timing adjusting method changes timing for making the energy beam reach the second power level in accordance with a combination of the respective lengths of the first and second states to be formed on the recording medium;

the second timing adjusting method changes timing for shifting the energy beam from the second power level to another energy level in accordance with a combination of the respective lengths of the second and first states to be formed on the recording medium;

the first timing correcting method operates so that in a case where the first edge position measuring method concludes that the time interval from the time corresponding to the mark edge position opposite to the first space of the first mark in the read signal of the first recording pattern to the time corresponding to the position of the boundary between the second mark and the first space in the read signal is loner than the time interval of (a+i)T, timing of arrival at the second power level for forming the second state with length mT is quickened only when the second state with length mT is to be formed so as to follow the first state with length iT by the first timing adjusting method; and in a case where the first edge position measuring method concludes that the time interval from the time corresponding to the mark edge position opposite to the first space of the first mark in the read signal of the first recording pattern to the time corresponding to the position of the boundary between the second mark and the first space in the read signal is shorter than the time interval of (a+i)T, the timing of arrival at the second power level for forming the second state with length mT is delayed only when the second state with length mT is to be formed so as to follow the first state with length iT by the first timing adjusting method, and the second timing correcting method operates so that in a case where the second edge position measuring method concludes that the time interval from the time corresponding to the position of the boundary between the second mark and the second space in the read signal of the second recording pattern to the time corresponding to the mark edge position opposite to the second space of the third mark in the read signal is loner than the time interval of (b+j)T, timing of shifting from the second power level to another energy level for forming the second state with length mT is delayed only when the first state with length jT is to be formed so as to follow the second state with length mT by the second timing adjusting method; and in a case where the second edge position measuring method concludes that the time interval from the time corresponding to the position of the boundary between the second mark and the second space in the read signal of the second recording pattern to the time corresponding to the mark edge position opposite to the second space of the third mark in the read signal is shorter than the time interval of (b+j)T, the timing of shifting from the second power level to another energy level for forming the second state with length mT is quickened only when the first state with length jT is to be formed so as to follow the second state with length mT by the second timing adjusting method.

(5) A recording medium permitted to get into a first state by a first power level of an energy beam and permitted to get into a second state by a second power level of the energy beam higher than the first power level, wherein at least one of information of timing for making the energy beam to reach the second power level and information of timing for shifting the power level from the second power level into another energy level both of which are determined using the information recording method described in (3) is recorded as not-rewritable information on the information recording medium.

(6) A recording medium permitted to get into a first state by a first power level of an energy beam and permitted to get into a second state by a second power level of the energy beam higher than the first power level, wherein at least one of information of timing for making the energy beam to reach the second power level and information of timing for shifting the power level from the second power level into another energy level both of which are determined using the information recording method described in (4) is recorded as not-rewritable information on the information recording medium.

(7) An information recording apparatus comprising:

an energy beam generator for generating an energy beam;

a power adjusting mechanism for setting a power level of the energy beam to a first power level and a second power level which is higher than the first power level;

a holding mechanism for holding a recording medium permitted to get into a first state by the first power level and permitted to get into a second state by the second power level;

a moving mechanism for moving the energy beam and the recording medium relatively to each other;

a positioning mechanism for irradiating a predetermined place of the recording medium with the energy beam; and a signal processing circuit for changing information to be recorded, into the power levels of the energy beam, wherein the information recording apparatus uses the information recording medium described in (5) or (6), and the apparatus further comprises:

means for reading the not-rewritable information recorded on the information recording medium to thereby decode at least one of the information of timing for making the energy beam to reach the second power level and the information of timing for shifting the power level from the second power level into another energy level; and means for modulating energy pulses in accordance with the decoded information of timing when the second states is formed on the recording medium.

(8) An information recording apparatus comprising:

an energy beam generator for generating an energy beam;

a power adjusting mechanism for setting a power level of the energy beam to a first power level and a second power level which is higher than the first power level;

a holding mechanism for holding a recording medium permitted to get into a first state by the first power level and permitted to get into a second state by the second power level;

a moving mechanism for moving the energy beam and the recording medium relatively to each other;

a positioning mechanism for irradiating a predetermined place of the recording medium with the energy beam; and a signal processing circuit for changing information to be recorded, into the power levels of the energy beam; and means for executing at least one of the first and second timing correcting methods described in (3) or at least one of the first and second timing correcting methods described in (4).

BRIEF DESCRIPTION OF THE DRAWINGS

FIG. 8 is a view showing a specific example of a recording pattern (in which each mark is 6vT long);

FIG. 9 is a view showing a specific example of a recording pattern (in which each mark is 5vT long);

FIG. 10 is a view showing a specific example of a recording pattern (in which each mark is 4vT long); and FIG. 11 is a view showing a specific example of a recording pattern (in which each mark is 3vT long).

DESCRIPTION OF THE PREFERRED EMBODIMENTS

The present invention will be described below in detail on the basis of the following embodiments.

(First Embodiment)

Figure 1:
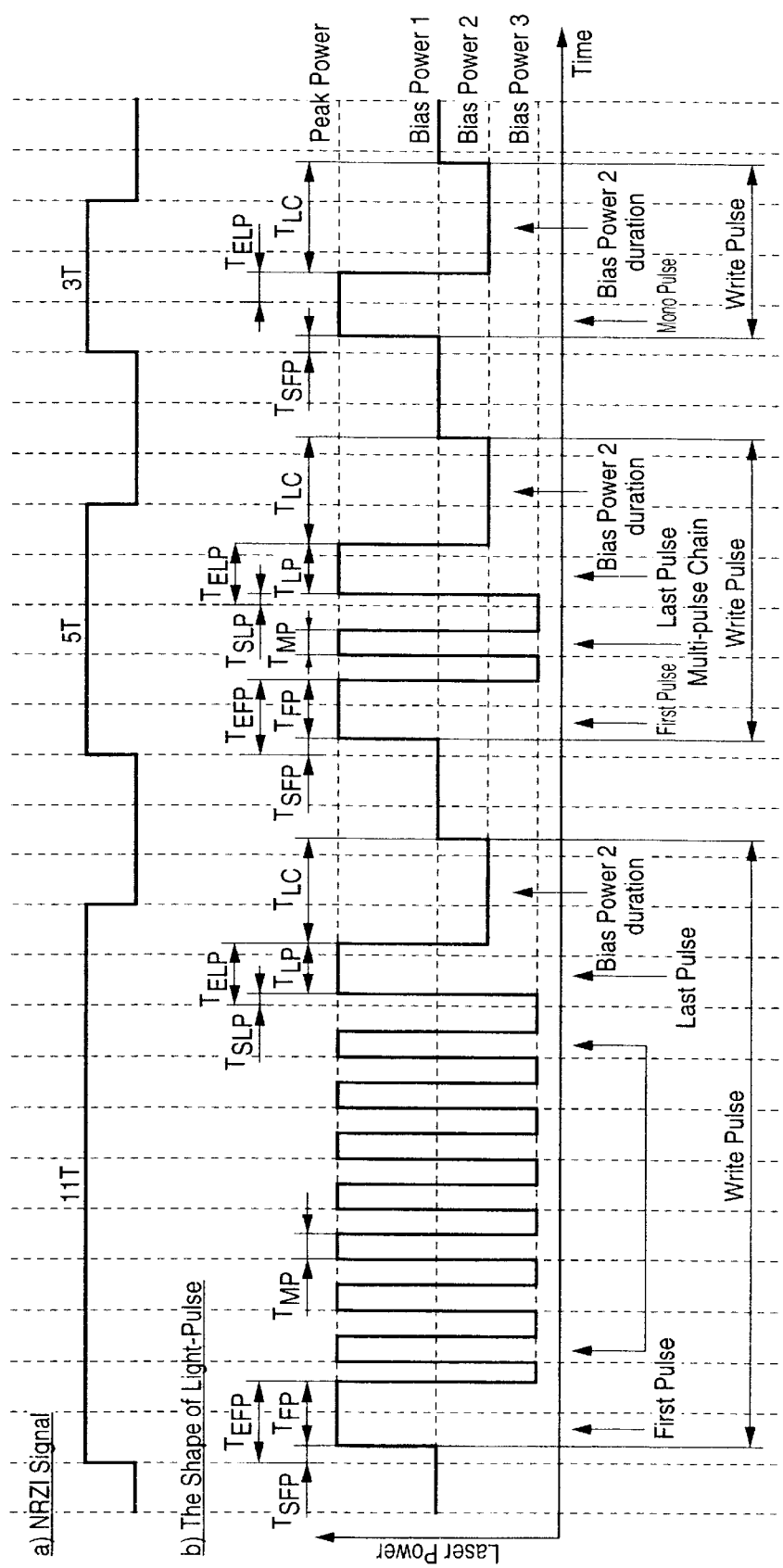
FIG. 1 is a diagram showing a specific example of a time modulation procedure (write strategy) of an irradiation amount of an energy beam according to the present invention.

Referring first to FIG. 1, there is shown an example of the change of a power level of an energy beam, which is irradiated on the recording medium when information is recorded thereon, with the passage of time. The way of changing the power level with the passage of time in the recording of information will be hereinafter referred to as "write strategy" or "recording strategy". The write or recording strategy will be described with respect to DVD-RAM as an example.

In the case of DVD-RAM, each of the shortest mark and the shortest space is 3T long (three times as long as T) when T is a time interval of a reference clock pulse signal for recording/reproducing. Further, each of the largest mark and the largest space is generally 11T long. As a special pattern, 14T-long mark and space may be provided.

When an NRZI signal is given as information to be recorded time-sequentially on a recording medium, the NRZI signal is converted into a time-sequential change of the power level of the energy beam by a suitable signal processing circuit. FIG. 1 shows the time-sequential change of the power level as waveforms of light pulses.

The power levels are set to four values, Peak Power, Bias Power 1, Bias Power 2 and Bias Power 3. The recording medium is permitted to get into a first state by Bias Power 1 (first power level) and is permitted to get into a second state by Bias Power 2 (second power level). Bias Power 3 (third power level) is equal to or less than Bias Power 1. When a region of the second state is formed on the recording medium and the length of the region is 4T or more (that is, the length of the NRZI signal is 4T or more), the energy beam is multi-pulsated by mixing the power level period of Bias Power 3 into the irradiation period of Peak Power. In the multi-pulsated energy beam, the first light pulse and the last light pulse will be referred to as "a first pulse" and "a last pulse", respectively. A light pulse reciprocating between Peak Power and Bias Power 3 is repeated in accordance with the length of the NRZI signal so that the repeated light pulses are disposed between the first pulse and the last pulse. The number of the repetitions is (n−4) when the length of the NRZI signal is nT (n>3). Each of the repeated pulses put between the first pulse and the last pulse is called "a comb-like pulse". That is, when the region of the second state correspondingly to the NRZI signal with length 5T is formed or more, the recording pulse signal is composed of the first pulse, the comb-like pulse and the last pulse. When the region of the second state corresponding to the NRZI signal with length 4T is formed, the recording pulse signal is composed of the first pulse and the last pulse. When the region of the second state corresponding to the NRZI signal with length 3T is formed, the recording pulse signal is composed of a single light pulse.

Bias Power 2 (fourth power level) set to be equal to or less than Bias Power 1 is used as follows. For the NRZI signal with the length equal to or more than 4T, the power level following the last pulse is kept in Bias Power 2 for a predetermined time. For the NRZI signal with length 3T, the power level following the single light pulse is kept in Bias Power 2 for a predetermined time.

There is a possibility that the power level of Bias Power 1 may be equal to that of Bias Power 2 or Bias Power 3. There is also a possibility that all the power levels of Bias Power 1, Bias Power 2 and Bias Power 3 may be the same. Reference values of Peak Power, Bias Power 1, Bias Power 2 and Bias Power 3 may be recorded, as medium information, in a suitable place on the recording medium in advance. A portion on the recording medium used to record the medium information concerning the recording strategy is called "a control data zone information track". The reference values of the power levels are read from the control data zone information track on the recording medium, and then the respective power levels in the writing mode are determined on the basis of the read reference values.

The definition of the recording waveform will be first described in the case where the region of the second state corresponding to the NRZI signal with the length equal to or more than 4T is formed on the recording medium. The leading edge of the first pulse of the write pulse string is defined by time after the passage of $T_{SFP}$ from the leading edge of the NRZI signal. The trailing edge of the first pulse of the write pulse string is defined by time after the passage of $T_{EFP}$ from the leading edge of the NRZI signal. The length of the first pulse is $T_{FP}$. The value of $T_{FP}$ is equal to a value obtained by subtracting $T_{SFP}$ from $T_{EFP}$. The leading edge of the last pulse of the write pulse string is defined by reference to time preceding the trailing edge of the NRZI signal by time 2T. The last pulse rises at time when time $T_{SLP}$ is passed after the reference time. The trailing edge of the last pulse of the write pulse string is also defined by reference to the time preceding the trailing edge of the NRZI signal by time 2T. The last pulse falls at time when time $T_{ELP}$ is passed after the reference time. The length of the last pulse is $T_{LP}$. The value of $T_{LP}$ is equal to a value obtained by subtracting $T_{SLP}$ from $T_{ELP}$.

The comb-like pulse string may be disposed between the first pulse and the last pulse. The leading edge of each comb-like pulse in the comb-like pulse string coincides with a reference clock position. Each comb-like pulse falls at time when time $T_{MP}$ is passed after the leading edge thereof.

The definition of the recording waveform will be described in the case where the region of the second state corresponding to the NRZI signal with length 3T is formed on the recording medium. The leading edge of the light pulse is present at time when $T_{SFP}$ is passed after the leading edge of the NRZI signal. The trailing edge of the light pulse is defined by reference to time preceding the tailing edge of the NRZI signal by time 2T. The trailing edge of the light pulse is present at time when time $T_{ELP}$ is passed after the reference time.

A portion having the power level of Bias Power 2 follows the last pulse in the case of the NRZI signal with the length equal to or more than 4T, or the recording pulse in the case of the NRZI signal with length 3T. The length of the portion is $T_{LC}$. The values of $T_{SFP}$, $T_{EFP}$, $T_{FP}$, $T_{SLP}$, $T_{ELP}$, $T_{LP}$, $T_{LC}$ and $T_{MP}$ for defining the recording pulse are determined on the basis of the reference values which are read from the control data zone information track of the recording medium.

The values of $T_{SFP}$, $T_{EFP}$, $T_{FP}$, $T_{SLP}$, $T_{ELP}$, $T_{LP}$, $T_{LC}$ and $T_{MP}$ for defining the recording pulse are not always constant but may be required to be changed in accordance with the combination of the NRZI signals. Particularly, when the case of the DVD-RAM with the recording capacity of 4.7 GB per side is taken as an example, length 3T of the shortest mark is about 0.42 μm which is shorter than the write spot radius 0.45 μm. When such a high-density recording is performed, the thermal interference between adjacent marks may become large, so that it is difficult to perform the stable recording continuously. Therefore, it is thought of that the recording waveform is changed adaptively in accordance with the combination of the front and rear of the NRZI signal. There are the following two methods for correcting the shifting of the front edge.

(1) A method of changing $T_{SFP}$ while fixing $T_{EFP}$. On this occasion, $T_{FP}$ changes with the change of $T_{SFP}$.

(2) A method of changing $T_{SFP}$ while fixing $T_{FP}$. On this occasion, $T_{EFP}$ changes with the change of $T_{SFP}$.

There are the following two methods for correcting the shifting of the rear edge.

(1) A method of changing $T_{ELP}$ while fixing $T_{SLP}$. On this occasion, $T_{LP}$ changes with the change of $T_{ELP}$.

(2) A method of changing $T_{ELP}$ while fixing $T_{LP}$. On this occasion, $T_{SLP}$ changes with the change of $T_{ELP}$.

The selection of the aforementioned methods for controlling the shifting of the front and rear edges depends on the way of designing the recording medium and the recording characteristic of the recording medium. As the recording medium producer knows best which method is to be selected for controlling the shifting of the front and rear edges, the recording medium producer can recommend the selection of the edge shifting control method for the information recording apparatus. That is, the recording medium producer writes information concerning the recommended edge shifting control method in a specific place on the recording medium, so that the information recording apparatus can read the recommendatory information to determine the edge shifting control method. In this case, the information recording apparatus can use thoroughly the medium characteristic intended by the recording medium producer, so that the information recording can be performed most stably. Further, the recording medium producer can prepare a look-up table for the edge shifting control and record the look-up table on the recording medium. The information recording apparatus reads the look-up table and then performs the edge shifting control on the basis of the look-up table. In this manner, the information recording apparatus can use thoroughly the medium characteristic intended by the recording medium producer, so that the information recording can be performed most stably. The aforementioned idea makes it possible to provide means of achieving the best recording compatibility while keeping the high-density recording.

When the length of the mark to be recorded at present is M(n) and the length of the space preceding the mark is S(n−1), the look-up table concerning the front edge contains the arrangement of values determined by the combinations of M(n) and S(n−1). This value may take a positive value or a negative value.

When the length of the mark to be recorded at present is M(n) and the length of the space following the mark is S(n+1), the look-up table concerning the rear edge contains the arrangement of values determined by the combinations of M(n) and S(n+1). This value also may take a positive value or a negative value.

When $T_{SFP}$ and $T_{ELP}$ are changed in accordance with the combinations of the front and rear edges of the NRZI signal as described above, the mark edge position can be controlled always accurately.

Although the use of the write strategy having four power levels in the recording mode makes it possible to form the marks stably, this is effective when the power levels are set appropriately. It is practicable but complex in procedure to find the optimum combination of the four power levels as four independent variables. Furthermore, there is a possibility that the large number of steps are required for achieving the optimum combination. Therefore, it is thought of that the four power levels are classified into groups and the groups are assigned independent variables to thereby make it possible to reduce the number of independent variables to thereby simplify the procedure of finding the optimum combination of independent variables.

In the case of the phase-change recording medium such as a DVD-RAM, it has been found from a process of elucidating the recording mechanism by examination that there are considerably high correlation among the levels of Bias Power 1, Bias Power 2 and Bias Power 3. Assume now that Peak Power is assigned to a first group and Bias Power 1, Bias Power 2 and Bias Power 3 are assigned to a second group. An independent variable assigned to the first group is called "magnification factor $\underline{x}$ (hereinafter merely referred to as "x")". An independent variable assigned to the second group is called "magnification factor $\underline{y}$ (hereinafter merely referred to as "y")". The initial value of Peak Power is multiplied by $\underline{x}$ to obtain the value of Peak Power in the recording mode. The initial values of Bias Power 1, Bias Power 2 and Bias Power 3 are multiplied by $\underline{y}$ to obtain the values of Bias Power 1, Bias Power 2 and Bias Power 3 in the recording mode. Information is recorded while $\underline{x}$ and $\underline{y}$ are changed variously and the recorded information is reproduced. The fluctuation (reproductive jitter) of a reproductive signal is measured. The values of $\underline{x}$ and $\underline{y}$ are adjusted so that the measured reproductive jitter is not larger than a predetermined value. In this manner, the number of the independent variables can be reduced from four to two, so that the procedure of finding the optimum combination of the independent variables can be simplified. Furthermore, as the procedure is simplified, the reliability on finding the optimum combination can be improved.

Another classification may be thought of. Particularly, the procedure can be simplified when the four power levels are collected into one group. That is, the initial value of Peak Power is multiplied by $\underline{z}$ to obtain the value of Peak Power in the recording mode, and the initial values of Bias Power 1, Bias Power 2 and Bias Power 3 are multiplied by $\underline{z}$ to obtain the values of Bias Power 1, Bias Power 2 and Bias Power 3 in the recording mode. Information is recorded while the magnification factor $\underline{z}$ (hereinafter merely referred to as "z") is changed variously and the recorded information is reproduced. The fluctuation of a reproductive signal (reproductive jitter) is measured. The value of $\underline{z}$ is adjusted so that the measured reproductive jitter is not larger than a predetermined value. In this manner, the number of the independent variables can be reduced from four to one, so that the procedure of finding the optimum combination of the independent variables can be simplified more greatly. Furthermore, as the procedure is simplified more greatly, the reliability on finding the optimum combination can be improved more greatly.

It is thought of that the initial values of Peak Power, Bias Power 1, Bias Power 2 and Bias Power 3 are determined on the basis of the recommended values which are read from the control data zone information track of the recording medium. In this case, the power levels can be optimized while the power balance in each group is kept on the basis of the values recommended by the recording medium maker. Accordingly, there is obtained a technical effect that the optimum power levels for the information recording can be determined while the compatibility is kept better.

As the method of assigning Peak Power to the first group and assigning Bias Power 1, Bias Power 2 and Bias Power 3 to the second group to obtain the optimum values of $\underline{x}$ and $\underline{y}$, there is a method in which the optimum values of $\underline{x}$ and $\underline{y}$ are obtained on the basis of the value of the reproductive jitter which is obtained in accordance with the combination of the values of $\underline{x}$ and $\underline{y}$ while $\underline{x}$ and $\underline{y}$ are changed at random. However, a method in which the optimum values of $\underline{x}$ and $\underline{y}$ are obtained while $\underline{x}$ and $\underline{y}$ are changed systematically may be rather excellent to obtain the optimum values accurately.

As a simplest method, there is the following method. The values of $\underline{x}$ and $\underline{y}$ are quantized at suitable step intervals in a range between the maximum value and the minimum value. The values of the reproductive jitter are obtained in accordance with all of the combinations of the values of $\underline{x}$ and $\underline{y}$. The combination of the values of $\underline{x}$ and $\underline{y}$ with which the obtained value of the reproductive jitter is not larger than a predetermined value is obtained. This method requires a considerable deal of time because the number of the measurement times of the reproductive jitter is large, but has a technical effect that the optimum values of $\underline{x}$ and $\underline{y}$ can be obtained securely.

As another method for obtaining the optimum values of $\underline{x}$ and $\underline{y}$, there is a method in which the following first, second and third procedures are carried out successively.

(1) First Procedure

The value of $\underline{y}$ is set to be "1". Value x1 of $\underline{x}$ to minimize the reproductive jitter is obtained while $\underline{x}$ is changed at intervals of suitable step width dx in a range of from the lower limit xs of $\underline{x}$ to the upper limit xm of $\underline{x}$. For example, when the lower limit xs, the upper limit xm and the step width dx are 0.85, 1.15 and 0.05, respectively, the value x1 of $\underline{x}$ to minimize the reproductive jitter is obtained by obtaining the value of the reproductive jitter corresponding to each value of $\underline{x}$ while changing $\underline{x}$ to 0.85, 0.9, 0.95, 1.0, 1.05, 1.1 and 1.15. Further, value x2 of $\underline{x}$ to make the value of the reproductive jitter equal to value $\underline{a}$ is obtained. The obtained value x2 is multiplied by $\underline{c}$ to obtain value x3. As a specific example, data of the values of the reproductive jitter obtained with the change of $\underline{x}$ are used. The value x2 of $\underline{x}$ to make the value of the reproductive jitter equal to the value $\underline{a}$ is obtained by the linear interpolation on the basis of two adjacent values of $\underline{x}$ when one of the values of the reproductive jitter corresponding to the two adjacent values of $\underline{x}$ is larger than the value $\underline{a}$ and the other is smaller than the value $\underline{a}$. When there is no data to be picked for the linear interpolation, the upper limit xm and/or the lower limit xs may be widened to take data of the values of the reproductive jitter in a wider range or the value x2 may be predicted by use of the existing data. Finally, the value x1 and the value x3 are compared with each other, so that smaller one is obtained as value x4.

When the minimum point of the reproductive jitter is to be obtained, it may be difficult to find the minimum point of the reproductive jitter because the reproductive jitter little changes though the value of $\underline{x}$ changes near the optimum value of $\underline{x}$. In this case, the following method may be used as a substitute for the method of finding the minimum point of the reproductive jitter. As a curve of the reproductive jitter for the value of $\underline{x}$ is depicted as a parabolic curve, two values of $\underline{x}$ are generally present as the value of $\underline{x}$ to make the value of the reproductive jitter equal to the value $\underline{a}$. Accordingly, smaller one x1L and larger one x1H of the values of $\underline{x}$ to make the value of the reproductive jitter equal to the value $\underline{a}$ are obtained. Then, an arithmetical mean of the values x1L and x1H is obtained as the value x1. However, in order to find the value x1L, it is necessary to increase the value of $\underline{x}$ to a considerably large value. Accordingly, there is a possibility that the value of $\underline{x}$ may be restricted by the upper limit of $\underline{x}$. Accordingly, in this case, it is difficult to apply the method using the values X1L and X1H.

(2) Second Procedure

The value of $\underline{x}$ is set to be x4. Value y1 of $\underline{y}$ to minimize the reproductive jitter is obtained while $\underline{y}$ is changed at intervals of suitable step width dy in a range of from the lower limit ys of $\underline{y}$ to the upper limit ym of $\underline{y}$. For example, when the lower limit ys, the upper limit ym and the step width dy are 0.85, 1.15 and 0.05, respectively, the value y1 of $\underline{y}$ to minimize the reproductive jitter is obtained by obtaining the value of the reproductive jitter corresponding to each value of $y$ while changing $y$ to 0.85, 0.9, 0.95, 1.0, 1.05, 1.1 and 1.15. When the minimum point of the reproductive jitter is to be obtained, it may be difficult to find the minimum point of the reproductive jitter because reproductive jitter little changes though the value of $y$ changes near the optimum value of $y$. In this case, the following method may be used as a substitute for the method of finding the minimum point of the reproductive jitter. As a curve of the reproductive jitter for the value of $y$ is depicted as a parabolic curve, two values of $y$ are generally present as the value of $y$ to make the value of the reproductive jitter equal to the value $a$. Accordingly, smaller one y1L and larger one y1H of the values of $y$ to make the value of the reproductive jitter equal to the value $a$ are obtained. Then, an arithmetical mean of the values y1L and y1H is obtained as the value y1. Either of the aforementioned methods may be used. The value of $y$ obtained by either of the aforeentioned methods may be used as the final value y1.

(3) Third Procedure

The value of $y$ is set to be y1. Value x5 of $x$ to minimize the reproductive jitter is obtained while $x$ is changed at intervals of the suitable step width dx in a range of from the lower limit xs of $x$ to the upper limit xm of $x$ in the same manner as in the first procedure. Further, value x6 of $x$ to make the value of the reproductive jitter equal to the value $a$ is obtained. The obtained value x6 is multiplied by $c$ to obtain value x7 in the same manner as in the first procedure. Finally, the value x5 and the value x7 are compared with each other, so that smaller one is obtained as value x8. When the minimum point of the reproductive jitter is to be obtained, it may be difficult to find the minimum point of the reproductive jitter because the reproductive jitter little changes though the value of $x$ changes near the optimum value of $x$. Also in this case, the minimum point of the reproductive jitter may be found in the same manner as in the substitutive method (using the values x1L and x1H) described above in the first procedure.

At time when the aforementioned first, second and third procedures are completed, the optimum values of $x$ and $y$ are judged to be x8 and y1, respectively. In the method using the first, second and third procedures successively to obtain the optimum values of $x$ and $y$, there is a technical effect that the optimum values of $x$ and $y$ are obtained by the minimum number of time of the jitter measurements.

Figure 2:
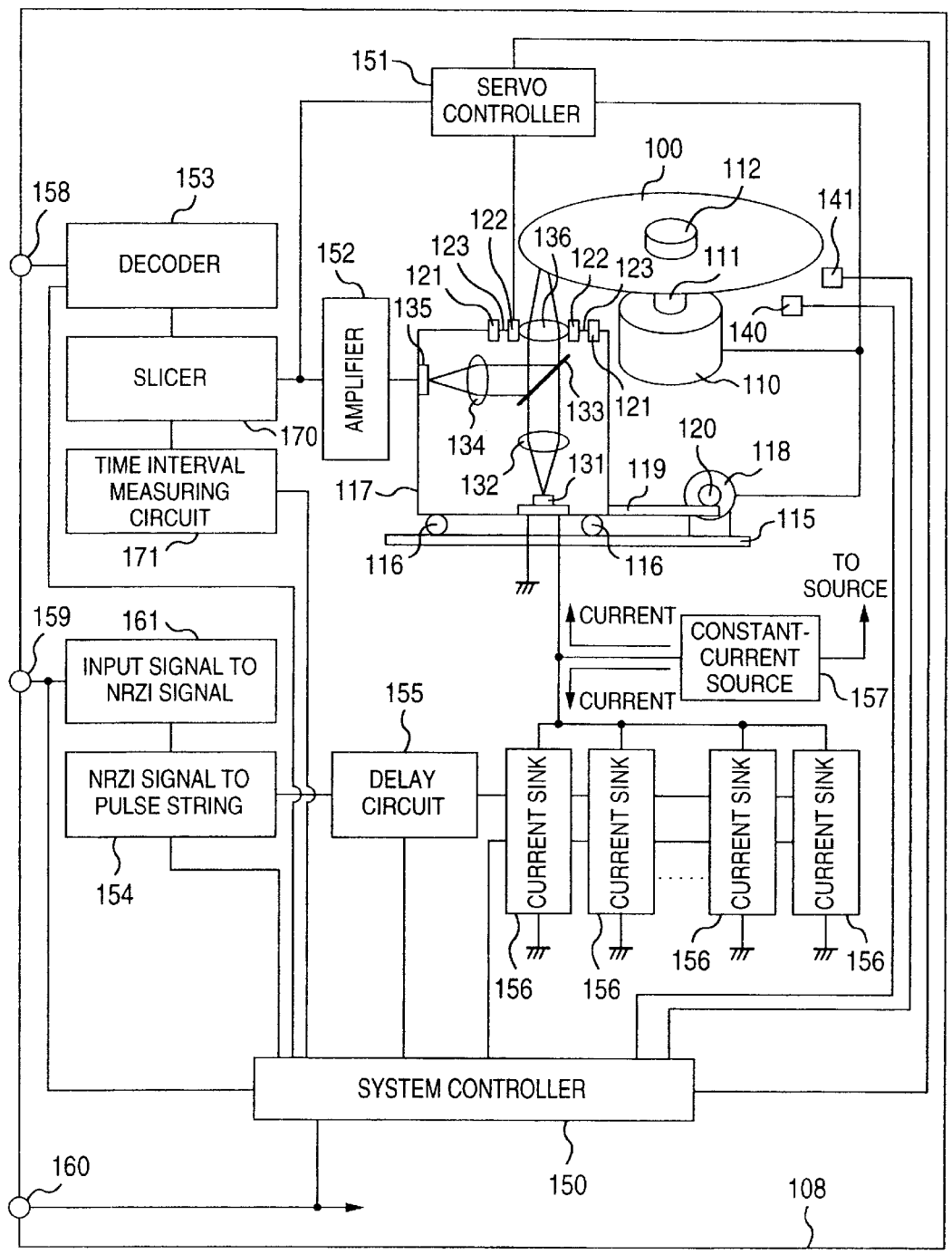
FIG. 2 is a block diagram of an information recording apparatus according to the present invention.

An information recording apparatus according to the first embodiment of the present invention will be described below with reference to FIG. 2. FIG. 2 is a block diagram of the information recording apparatus according to the first embodiment of the present invention. For convenience' sake of description, FIG. 2 shows the case where a recording medium 100 is mounted on the information recording apparatus. The recording medium 100 is essential for storage of information. The recording medium 100 can be detached from the information recording apparatus or attached onto the information recording apparatus as occasion demands.

Referring to FIG. 2, a disk clamping mechanism 112 is attached to a rotation shaft 111 of a motor 110 which is attached to a box 108. The disk clamping mechanism 112 holds the recording medium 100. That is, the disk clamping mechanism 112 serves as a mechanism for holding the recording medium 100. Further, the motor 110, the rotation shaft 111 and the disk clamping mechanism 112 constitute a moving mechanism for moving the recording medium 100 and the energy beam relatively.

A rail 115 is attached to the box 108. Rail guides 116 guided by the rail 115 are attached to a casing 117. A linear gear 119 is also attached to the casing 117. A rotary gear 120 is attached to the linear gear 119. The rotation of a rotating motor 118 attached to the box 108 is transmitted to the rotary gear 120 to thereby move the casing 117 linearly along the rail 115. The direction of the linear motion substantially coincides with the direction of the radius of the recording medium 100.

Magnets 121 are attached to the casing 117. An objective lens 136 is also attached to the casing 117 through suspensions 123. The suspensions 123 can move the objective lens 136 both in the direction substantially equal to the direction of the normal to the recording surface of the recording medium 100 and in the direction substantially equal to the direction of the radius of the recording medium 100. Coils 122 are attached to the objective lens 136 so as to be substantially opposite to the magnets 121, respectively. The objective lens 136 can be moved both in the direction substantially equal to the direction of the normal to the recording surface of the recording medium 100 and in the direction substantially equal to the direction of the radius of the recording medium 100 by magnetic force generated when electric current is supplied to the coils 122. The rail 115, the rail guides 116, the casing 117, the magnets 121, the suspensions 123, the coils 122 and the objective lens 136 constitute a positioning mechanism for irradiating a predetermined place of the recording medium 100 with an energy beam.

A semiconductor laser 131 which serves as an energy beam generator is attached to the casing 117. The energy beam emitted from the semiconductor laser 131 passes through both a collimating lens 132 and a beam splitter 133 and then passes through the objective lens 136. A part of light passed through the objective lens 136 is reflected by the recording medium 100 and then passes through the objective lens 136 so as to enter the beam splitter 133. A part of the light is reflected toward a detection lens 134 by the beam splitter 133, converged by the detection lens 134 and then enters a photo detector 135. As a result, the light intensity thereof is detected. The photo detector 135 is divided into a plurality of light-receiving areas. Light intensity detected by each light-receiving area is amplified and calculated by an amplifier 152 so that information (a servo signal) of the relative positional relation between a light spot converged by the objective lens 136 and the recording medium 100 and an information read signal are detected. The servo signal is sent to a servo controller 151. The read signal is sent to a slicer 170 and two-valued by the slicer 170. The two-valued signal is sent both to a decoder 153 and to a time interval measuring circuit 171.

When the recording medium 100 is mounted on the information recording apparatus and fixed by the disk clamping mechanism 112, a detector 140 operates to send its output signal to a system controller 150. The system controller 150 controls the motor 110 on the basis of the output signal of the detector 140 to rotate the recording medium 100 at an appropriate rotational speed. Further, the system controller 150 controls the rotating motor 118 to position the casing 117 in an appropriate position. Further, the system controller 150 makes the semiconductor laser 131 emit light. At the same time, the system controller 150 operates the servo controller 151 to operate the rotating motor 118 and supply electric current to the coils 123 so that the focal spot formed by the objective lens 136 is positioned in a predetermined place of the recording medium 100. Then, the servo controller 151 sends a signal to the system controller 150 so as to inform it of the fact that the focal spot is formed in the recording medium 100. The system controller 150 gives an instruction to the decoder 153 to decode the read signal. When the read track is not the control data zone information track, the system controller 150 gives an instruction to the servo controller 151 so that the focal spot is positioned on the control data zone information track. On the basis of the aforementioned operation, the system controller 150 reads the medium information concerning the recording from the control data zone information track.

Information concerning the recording strategy described above with reference to FIG. 1 is written in the control data zone information track in advance. The system controller 150 reads parameters of the recording strategy from the recording medium 100 to specify information such as the recording power levels, time-relations among the recording pulses, the look-up tables, the recommended adaptive control methods and so on. The system controller 150 writes these parameters of the recording strategy in a parameter table of the signal processing circuit 154, a parameter table of a delay circuit 155 and current sink amount parameter tables of current sinks 156. By the selection of the adaptive control method, the way of writing parameters in the parameter table of the delay circuit 155 is changed or a switch of the delay circuit 155 is changed, so that the operation of each adaptive control method described above with reference to FIG. 1 is achieved.

Only when the recording medium 100 is write-enabled, the system controller 150 may read the parameters of the recording strategy of the recording medium 100 and then write these in the parameter table of the signal processing circuit 154, the parameter table of the delay circuit 155 and the current sink amount parameter tables of the current sinks 156. For example, when the recording medium 100 is write-disabled because a write protection switch provided in the casing of the recording medium 100 and so forth is selected in a write-disabled position or a high-order controller of the information recording apparatus instructs write-disable, a series of operations such as the reading of the recording strategy parameters or the like can be omitted. A detection switch 141 is attached to the box 108 in order to detect the write protection switch. An output signal of the detection switch 141 is sent to the system controller 150. In the write-disabled state, the operation of reading the recording strategy parameters can be stopped to shorten the readiness time for making the recording medium 100 read-enabled after the fixation of the recording medium 100 by the disk clamping mechanism 112.

When an instruction to reproduce information is given from the high-order controller through an input connector 159, the system controller 150 instructs the servo controller 151 to position the focal spot in a suitable place of the recording medium 100. After a signal obtained in the photo detector 135 is decoded by the slicer 170 and the decoder 153, information read through an output connector 158 is sent to the high-order controller.

When an instruction to write information as well as information to be written is given from the high-order controller through the input connector 159, the system controller 150 instructs the servo controller 151 to position the focal spot in a suitable place of the recording medium 100. The information to be written is converted into an NRZI signal by a signal processing circuit 161. The NRZI signal is converted into a string of suitable pulses by the signal processing circuit 154. The pulse string is sent to the current sinks 156 through the delay circuit 155. The signal processing circuits 161 and 154 constitute a signal processing circuit by which the information to be written is converted into a recording pulse string (that is, power levels of the energy beam).

A constant-current source 157 is connected to the semiconductor laser 131 so that the total current consumed by the semiconductor laser 131 and the current sinks 156 is kept constant. The plurality of current sinks 156 are connected to the constant-current source 157. It depends on the pulse string generated by the signal processing circuit 154 and then passed through the delay circuit 155 whether the current sinks 156 operate to absorb current or not. By the operation of the current sinks 156, a part of current output from the constant-current source 157 is absorbed to the current sinks 156, so that the amount of current flowing into the semiconductor laser 131 is reduced. Accordingly, the energy level of the energy beam emitted from the semiconductor laser 131 is changed. When the plurality of current sinks 156 are operated in suitable timing, the signal processing circuit 154 and the delay circuit 155 achieve the recording strategy shown in FIG. 1.

In order to carry out the aforementioned operation, the information recording apparatus is supplied with electric power through a terminal 160 from the outside.

When the necessity of writing information occurs or before information writing occurs, the power level of the energy beam for writing information may be optimized or updated. In this case, the system controller 150 sends a suitable recording pattern to the signal processing circuit 154 to form a string of recording marks on the recording medium 100. Then, a reproductive signal obtained by reproduction of the recording mark string is two-valued by the slicer 170 and then sent to the time interval measuring circuit 171. The time interval measuring circuit 171 measures the fluctuation (jitter) of the reproductive signal and sends the measured result to the system controller 150. The system controller 150 changes the recording power levels on the basis of the measured result of the fluctuation (jitter) and according to the procedures described above with reference to FIG. 1. The system controller 150 sends the suitable recording pattern to the signal processing circuit 154 again to form the recording mark string on the recording medium 100 using the new recording power levels. In this manner, when the measurement of the reproductive jitter as well as the updating of the recording power levels is repeated by the necessary number of times, the optimum recording power levels for writing information in the given recording medium 100 can be generated as occasion demands. Accordingly, there is a technical effect that information can be always written on the recording medium 100 stably and reliably.

Incidentally, there is a circuit having a time interval analyzer (TIA) function as an example of the time interval measuring circuit 171. As another example of the time interval measuring circuit 171, there is a method in which PLL (Phase-Locked Loop) is applied to a digital signal two-valued by the slicer 170 and the magnitude of an error signal in the PLL (the amount of mismatch between the edge position of a clock signal generated in the PLL and the edge position of the two-valued digital signal) is regarded as the jitter amount of the two-valued digital signal. A PLL circuit is essential when the reproductive signal is decoded by the decoder 153. Accordingly, the use of the PLL error signal has a technical effect that it is unnecessary to implement the information recording apparatus with a new TIA specially. As a further example of the time interval measuring circuit 171, there is a method in which the digital signal two-valued by the slicer 170 is compared with the recording pattern given to the signal processing circuit 154 in the writing mode and the frequency of error pulses obtained from the amount of mismatches in the comparison is regarded as the jitter amount of the two-valued digital signal. In this case, there is a technical effect that the jitter amount of the two-valued digital signal can be evaluated without providing any new circuit in the information recording apparatus specially.

As described above, according to the present invention, the recording mark edges can be always positioned in the predetermined points stably even in the case where the high-density recording in which the shortest recording mark length is not larger than the radius of the recording spot is performed. Accordingly, there is a technical effect that information can be always recorded in the recording medium stably and reliably.

(Second Embodiment)

An information recording method according to a second embodiment of the present invention will be described below with reference to FIG. 1.

As described above, it is thought of that the initial values of Peak Power, Bias Power 1, Bias Power 2 and Bias Power 3 are determined on the basis of the recommended values which are read from the control data zone information track of the recording medium.

Assume now that the recording medium, the recording power levels for the recording medium and the look-up tables for the edge shifting are given to the information recording apparatus. The values of the recording power levels and look-up tables may be those which are read from a predetermined place of the recording medium, or may be obtained by some method in the information recording apparatus. The information recording apparatus performs the recording using the recording power levels and the look-up tables. However, the given recording power levels and the given look-up tables do not always indicate the optimum values for the combination of the present recording characteristic of the information recording apparatus and the recording medium. Because the recording characteristic of the information recording apparatus may change with the change of the environmental temperature in use and with the passage of time or there may be the variation of the recording characteristic among the information recording apparatuses. That is, here is considered the case where a problem of compatibility occurs in the recording power levels and the look-up tables because of the change of characteristic with the passage of time, the individual difference in the characteristic of the information recording apparatus, and so on.

In a conventional phase-change recording medium, only the optimization of the recording power levels needs to be considered when there is no look-up table for the edge shifting in the recording mode. When the DVD-RAM with the capacity of 2.6 GB per side is taken as an example, the optimum recording power levels are generally set by the following procedure though there are various methods for setting the recording power levels depending on the information recording apparatuses.

(1) While Bias Power 1 (named by Standard Book for DVD-RAM with a capacity of 2.6 GB per side) and Bias Power 2 (named by Standard Book for DVD-RAM with a capacity of 2.6 GB per side) are fixed but Peak Power (named by Standard Book for DVD-RAM with a capacity of 2.6 GB per side) is changed, a random pattern is recorded and then reproduced to measure the jitter of the productive signal. A recording power level which is 1.2 times as much as the recording power level to make the value of the jitter equal to 13% is set as Peak Power (named by Standard Book for DVD-RAM with a capacity of 2.6 GB per side).

(2) While Bias Power 1 (named by Standard Book for DVD-RAM with a capacity of 2.6 GB per side) is changed, a random pattern is recorded and then reproduced to measure the jitter of the reproductive signal. The bias power level to minimize the value of the jitter is set as Bias Power 1 (named by Standard Book for DVD-RAM with a capacity of 2.6 GB per side). Alternatively, a bias power level at the midpoint of two points at each of which the value of the jitter is equal to 13% is set as Bias Power 1 (named by Standard Book for DVD-RAM with a capacity of 2.6 GB per side).

(3) As occasion demands, the steps (1) and (2) are retried.

That is, the optimum recording power levels are obtained on the basis of the curve of the jitter of the reproductive signal which is obtained by recording and then reproducing the random pattern.

When the higher-density recording than the DVD-RAM with a capacity of 2.6 GB per side is performed by use of the edge-shifting look-up tables which are absent in the DVD-RAM with a capacity of 2.6 GB per side, it may be impossible to set the power levels sufficiently accurately on the basis of the aforementioned measurement of the reproductive jitter of the random pattern. That is, the edge-shifting look-up tables per se may be out of compatibility. In this case, the aforementioned reproductive jitter of the random pattern takes a value worse than that is expected because the look-up tables are unsuitable, so that the power levels cannot be determined normally. In this case, it may be preferable that the power levels are set without using the look-up tables which have been already out of compatibility.

The inventor(s) of the present application has examined the way of updating the recording power levels and the look-up tables in the case where the recording power levels and the look-up tables are out of compatibility as described above. Conclusively, it is recognized that the recording power levels and the look-up tables can be updated accurately when the following procedure is carried out in the information recording apparatus using the phase-change medium having the higher surface density than the DVD-RAM with a capacity of 2.6 GB per side and performing the recording control using the look-up tables.

(1) Peak Power and Bias Power are set on the basis of a repetition pattern of mark and space having the same length. Peak Power and Bias Power thus set are called temporary Peak Power and temporary Bias Power, respectively. A sequence for determining the power levels and a recording pattern are of importance. Incidentally, the terminology "Bias Power" used herein contains Bias Power 1, Bias Power 2 and Bias Power 3 shown in FIG. 1.

(2) The look-up tables are optimized using the temporary Peak Power and the temporary Bias Power.

(3) Peak Power and Bias Power are set on the basis of a random pattern using the optimized look-up tables. A sequence for determining the power levels and the recording pattern are of importance.

Although there are various methods for setting Peak Power and Bias Power specifically in the step (1), a method convenient to the information recording apparatus may be selected. It is important that the sequence for setting the power levels (a sequence in which Peak Power is optimized while Bias Power is fixed to an optimum value after Bias Power is optimized while Peak Power is fixed to its initial value) and the repetition pattern of mark and space having the same length are used. The necessity of the sequence will be described below.

Figure 3:
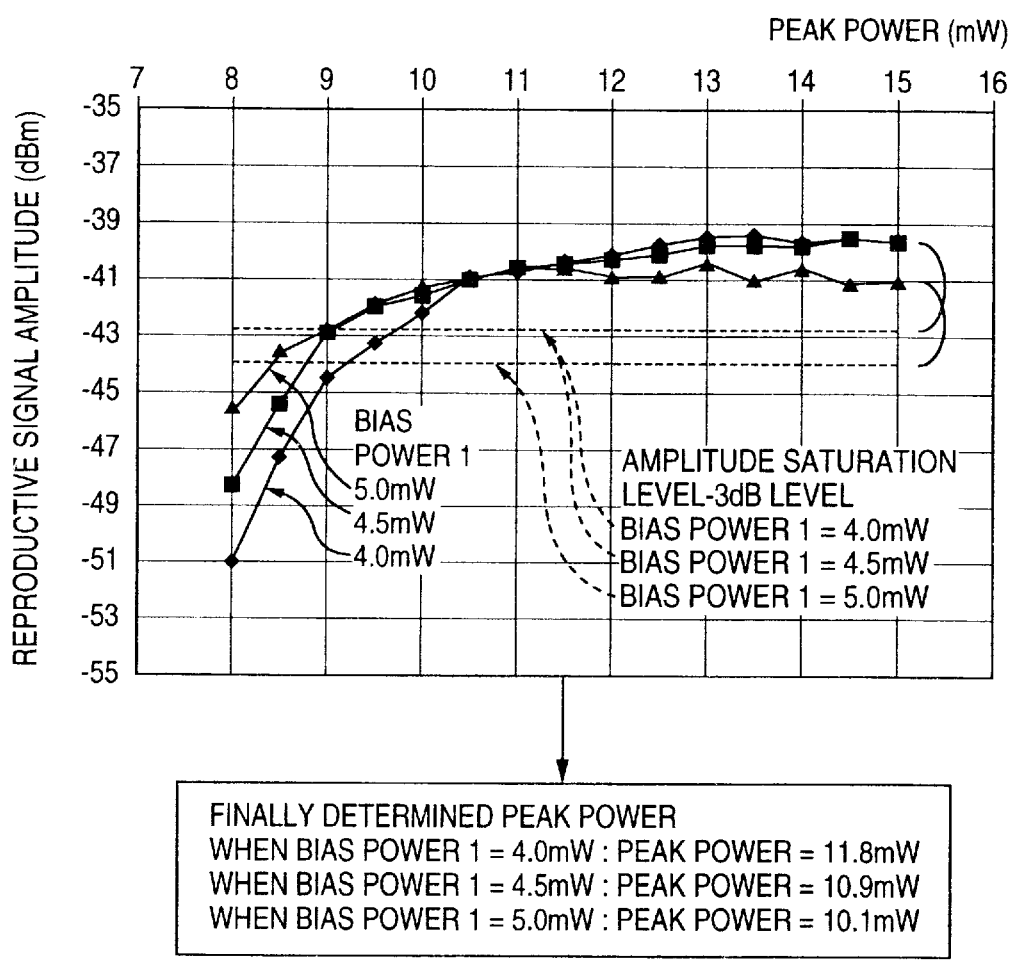
FIG. 3 is a graph showing an example of experimental results of a reproductive signal amplitude versus values of Peak Power.

FIG. 3 shows an experimental example for determining Peak Power. The experiment is made under the condition of the DVD-RAM with a capacity of 4.7 GB per side. The abscissa axis shows Peak Power. The amplitude of the reproductive signal of the repetition pattern of mark with length 3T and space with length 3T is plotted on Peak Power. Bias Power 1 is used as a parameter. When Bias Power 1 is to be changed, Bias Power 2 and Bias Power 3 are changed so that the ratios of Bias Power 2 and Bias Power 3 to Bias Power 1 are kept constant. When Peak Power is to be obtained from this experiment, the value of Peak Power obtained when the amplitude of the reproductive signal is reduced by 3 dB from the saturation level of the amplitude in the large value of Peak Power is multiplied by 1.2 to obtain the optimum power level. It is obvious from the experimental result that the optimum value of Peak Power changes as Bias Power 1 changes. That is, when a sequence in which Peak Power is first optimized is used for optimizing Peak Power and Bias Power, the optimum value of Peak Power changes in accordance with the initial value of Bias Power which is given at option for optimizing Peak Power.

Figure 4A:
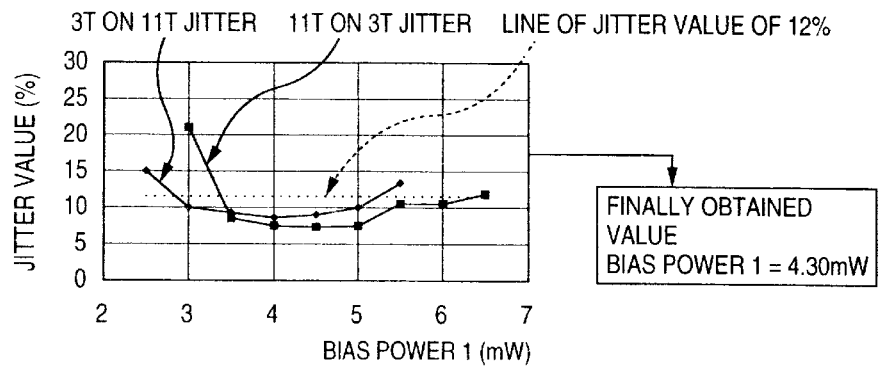
FIGS. 4A–4C are graphs showing examples of experimental results of reproductive signal jitter versus values of Bias Power.
Figure 4B:
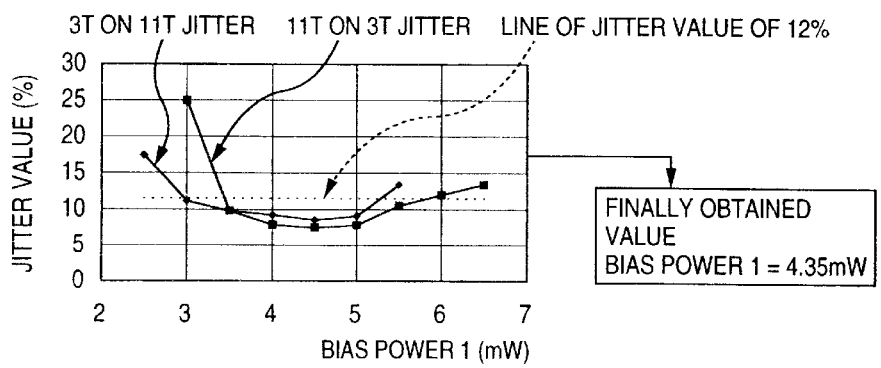
Figure 4C:
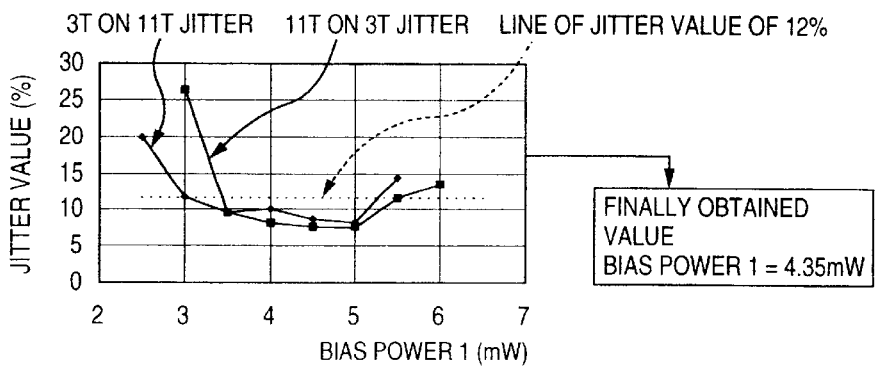

FIGS. 4A–4C show experimental examples for determining Bias Power 1. In each of the graphs, the abscissa axis shows Bias Power 1. There are plotted a jitter curve (3T on 11T) in the case where the repetition pattern of mark with length 3T and space with length 3T is overwritten on the repetition pattern of mark with length 11T and space with length 11T, and a jitter curve (11T on 3T) in the case where the repetition pattern of mark with length 11T and space with length 11T is overwritten on the repetition pattern of mark with length 3T and space with length 3T. The ordinate axis shows the value of the jitter. An overlap portion of the two curves is sliced at the jitter value of about 13%, so that an average of the two values of Bias Power 1 at the jitter value of 13% is set as the optimum value of Bias Power 1. When Bias Power 1 is to be changed, Bias Power 2 and Bias Power 3 are changed so that the ratios of Bias Power 2 and Bias Power 3 to Bias Power 1 are kept constant. When the aforementioned optimization is performed while Peak Power is changed, the value of Bias Power 1 which is always kept constant is obtained irrespective of the value of Peak Power. That is, when Bias Power 1 is first optimized in the case where Peak Power and Bias Power 1 are optimized, the optimum value of Bias Power 1 which is always correct is obtained irrespective of the initial value of Peak Power. Further, when Peak Power is optimized after the optimization of Bias Power 1, the optimum value of Peak Power is also obtained. As described above, not the random pattern but the repetition pattern of mark and space having the same length is used in the optimization of Bias Power 1 and Peak Power. This is important to determine the power levels irrespective of the look-up tables which have been already out of compatibility. When the aforementioned recording pattern and the aforementioned optimizing sequence are used, there is a technical effect that the recording power levels which are always correct can be determined.

In the step (2), the look-up tables are updated. As the temporary power levels are determined in the step (1), the look-up tables at the optimum power levels can be determined. Although there are various methods for determining the look-up tables, the look-up tables may be determined by a method convenient to the information recording apparatus. Accordingly, the way of determining the look-up tables will be not described hereinafter.

In the step (3), the recording power levels are determined finally. The reason why the recording power levels are adjusted finally though the temporary power levels and the look-up tables have been already determined in the steps (1) and (2) is that an optimum recording condition in a random pattern is found. As the look-up tables have been already updated in the step (2), the jitter in the random pattern is reduced sufficiently. Accordingly, the reproductive jitter in the random pattern is an effective means for determining the recording power levels. Although various procedures are used for determining the power levels specifically, any procedure may be selected in accordance with the information recording apparatus. An example of the procedure will be described below. While Bias Power 1 is changed in the condition that Peak Power is set to be equal to the temporary Peak Power, a random pattern is recorded and then reproduced to measure the reproductive jitter. The bias power level to minimize the reproductive jitter is set as the optimum Bias Power 1. Alternatively, the bias power level at the midpoint of two jitter points crossing the reproductive jitter value of 13% is set as the optimum Bias Power 1. Then, while Peak Power is changed in the condition that Bias Power 1 is set to the optimum Bias Power 1, a random pattern is recorded and then reproduced to measure the reproductive jitter. A recording power level which is 1.2 times as much as the recording power level to make the reproductive jitter value equal to 13% is set as the optimum Peak Power. As occasion demands, the setting of Bias Power and Peak Power is repeated. A sequence for optimizing the power levels is of importance. It is important from the same necessity as described above that Peak Power is set after the optimization of Bias Power 1. Although here is described "optimization of Bias Power 1", Bias Power 2 and Bias Power 3 are changed with the change of Bias Power 1 while the ratios of Bias Power 2 and Bias Power 3 to Bias Power 1 are kept constant.

An information recording apparatus according to the second embodiment of the present invention will be described below. The configuration of the information recording apparatus according to this embodiment is the same as that of the information recording apparatus according to the first embodiment of the present invention shown in FIG. 2. Accordingly, the operation of the information recording apparatus according to this embodiment will be described below with reference to FIG. 2.

When the necessity of writing information occurs or before the information writing occurs, the power level of the energy beam for writing information may be optimized or the value of the power level may be updated. Further, the look-up table for correcting the front edge timing and the look-up table for correcting the rear edge timing in the write mode may be optimized or the table values may be updated. In this case, the system controller 150 sends a suitable recording pattern to the signal processing circuit 154 to form a recording mark string on the recording medium 100. Then, the recording mark string is reproduced. The level of the reproductive signal is measured by the amplifier 152, and then the measured value is sent to the system controller 150. Further, the reproductive signal is two-valued by the slicer 170, and then sent to the time interval measuring circuit 171. The time interval measuring circuit 171 measures the fluctuation (jitter) of the reproductive signal, and sends the measured result to the system controller 150. The system controller 150 changes the recording power levels according to the procedure described above with reference to FIGS. 3 and 4A–4C on the basis of the measured result of the reproductive signal level in the amplifier 152 and the measured result of the jitter in the time interval measuring circuit 171. Then, the system controller 150 sends the suitable recording pattern to the signal processing circuit 154 again to form a recording mark string in the recording medium 100 using the new recording power levels. In this manner, when the measurement of the reproductive signal level and reproductive jitter and the updating of the recording power level on the basis of the measured results thereof are repeated by the necessary number of times, the optimum recording power level for writing information in the given recording medium 100 can be determined as occasion demands.

Further, the system controller 150 sends the suitable recording pattern to the signal processing circuit 154 to form a recording mark string on the recording medium 100. Then, the recording mark string is reproduced. The reproductive signal is two-valued by the slicer 170 and then sent to the time interval measuring circuit 171. The time interval measuring circuit 171 measures the fluctuation (jitter) of the reproductive signal and sends the measured result to the system controller 150. When the obtained jitter is insufficient, the system controller 150 changes the values of the front and rear edge timing correction look-up tables according to the procedure described above with reference to FIGS. 1, 3 and 4A–4C. Then, the system controller 150 sends the suitable recording pattern to the signal processing circuit 154 again to form a recording mark string in the recording medium 100 using the new front and rear edge timing. In this manner, the measurement of the reproductive jitter and signal edge shifting and the updating of the correction values of the front and rear edge timing correction look-up tables on the basis of the results of the above measurement are repeated, so that the optimum look-up tables for writing information in the given recording medium 100 can be determined as occasion demands.

As described above, according to the present invention, the recording power levels and the recording correction look-up tables both of which are always accurate can be obtained by the simple procedure even in the case where the recording characteristic of the information recording apparatus varies due to the change with the passage of time, the change of temperature and so forth. Accordingly, there is a technical effect that information can be always recorded stably.

(Third Embodiment)

An information recording method according to a third embodiment of the present invention will be described below. A mark string to be recorded in the recording medium will be described first with reference to FIGS. 5A and 5B.

Figure 5A:
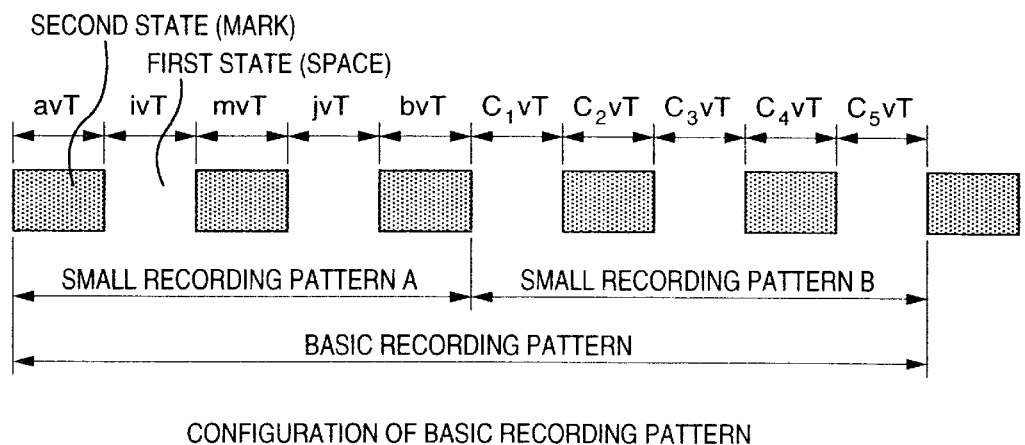
FIGS. 5A–5B are views for explaining mark strings to be recorded on a recording medium.

FIG. 5A shows a second state (hereinafter referred to as "mark") and a first state (hereinafter referred to as "space") of the recording medium both of which are recorded on the recording medium. Let T be the period of a clock signal (recording timing generating clock signal) which operates with a reference frequency when marks and spaces are recorded. Let $v$ be the velocity of the energy beam relative to the recording medium. A small recording pattern "A" (first small recording pattern) is composed of a mark (first mark) with length $avT$, a space (first space) with length $ivT$ following the first mark, a mark (second mark) with length $mvT$ following the first space, a space (second space) with length $jvT$ following the second mark, and a mark (third mark) with length $bvT$ following the second space. A small recording pattern "B" (second small recording pattern) is composed of a space with length $C_1vT$, a mark with length $C_2vT$ following the space, a space with length $C_3vT$ following the mark, a mark with length $C_4vT$ following the space, and a space with length $C_5vT$ following the mark. That is, the small recording pattern B starts from the first state (space) and ends with the first state (space) so that the first state (space) and the second state (mark) appear alternately by the finite number of times. The small recording pattern A and the small recording pattern B following the small recording pattern A form a basic recording pattern. Here, $a$, $i$, $m$, $j$, $b$ and $C_1$ to $C_5$, which are parameters expressing the lengths of marks and spaces, are all natural numbers (positive integers).

A value obtained when a sum value obtained by the arithmetical addition of all space length parameters contained in the basic recording pattern is subtracted from a sum value obtained by the arithmetical addition of all mark length parameters contained in the basic recording pattern is called "Digital Sum Value (DSV)". When the lengths of marks and spaces are adjusted so that the DSV of the basic recording pattern becomes zero, the dignity of the reproductive signal of the mark string is improved.

Figure 5B:
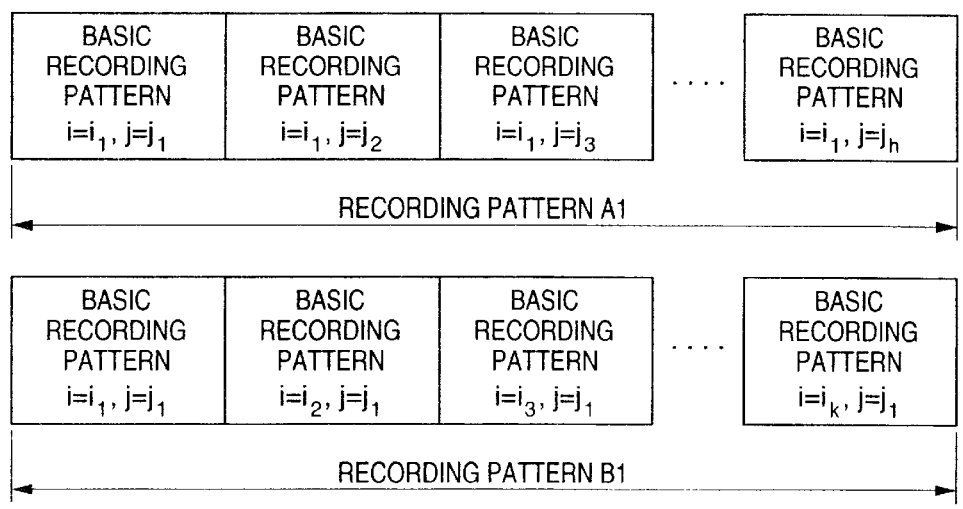

A recording pattern is in a state in which the basic recording pattern appears repeatedly. An example of the recording pattern will be described below with reference to FIG. 5B. A recording pattern A1 (first recording pattern) is composed of a plurality of basic recording patterns. In the recording pattern A1, the various values of parameter $j$ are prepared for the respective basic recording patterns (FIG. 5B shows the case where $j$ changes from $j_1$ to $j_h$). The value of parameter $j$ may be changed at random in a range of from a lower limit to an upper limit. A recording pattern B1 (second recording pattern) is also composed of a plurality of basic recording patterns. In the recording pattern B1, the various values of parameter $i$ are prepared for the respective basic recording patterns (FIG. 5B shows the case where $i$ changes from $i_1$ to $i_k$). The value of parameter $i$ may be changed at random in a range of from a lower limit to an upper limit.

Reproductive signals obtained when the recording patterns A1 and B1 recorded as shown in FIGS. 5A and 5B are reproduced, and processing methods therefor will be described below with reference to FIGS. 6A and 6B. Incidentally, for convenience' sake of description, the movement direction of the energy beam relative to the recording medium is assumed to be from the left to the right in FIGS. 6A and 6B. Further, in each mark, the mark border in a direction reverse to the movement direction of the energy beam is referred to as "front edge", and the mark border in the movement direction of the energy beam is referred to as "rear edge".

Figure 6A:
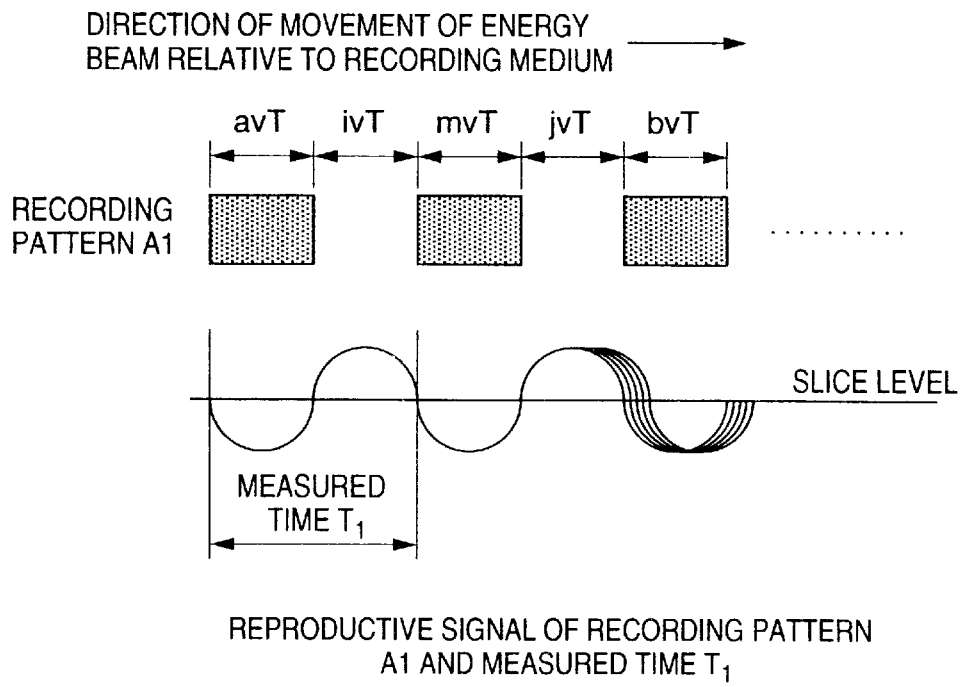
FIGS. 6A–6B are views for explaining a reproductive signal.

FIG. 6A shows a part of the recording pattern A1 depicted in FIG. 5B and a reproductive signal corresponding to the recording pattern A1. The position where the reproductive signal crosses the slice level downward shows the front edge in the reproductive signal. The time interval from the front edge of the avT-long mark (first mark) to the front edge of the mvT-long mark (second mark) is measured from the reproductive signal by a time interval measurer. A result obtained by the measurement is set as measured time $T_1$. The fact that the measured time $T_1$ does not coincide with the time interval $(a+i)T$ indicates the fact that the front edge of the mvT-long mark (second mark) is not located in an appropriate position. In this manner, the position of the front edge of the mvT-long mark (second mark) can be measured from the reproductive signal.

It is now important that the length of the jvT-long space (second space) following the mvT-long mark (second mark) changes variously. There is a fear that the irradiation with the energy beam for recording the bvT-long mark (third mark) may cause the fluctuation of the front edge position of the mvT-long mark (second mark). Further, the quantity of the fluctuation is also a function of the length of the jvT-long space (second space). Therefore, the length of the jvT-long space (second space) is changed variously so that an averaged quantity of the fluctuation is obtained. Accordingly, the measurement of the averaged front edge position brings a technical effect that the mark edge position can be measured reliably even in the case where the front edge position of the mvT-long mark (second mark) is made to fluctuate by the bvT-long mark (third mark).

Figure 6B:
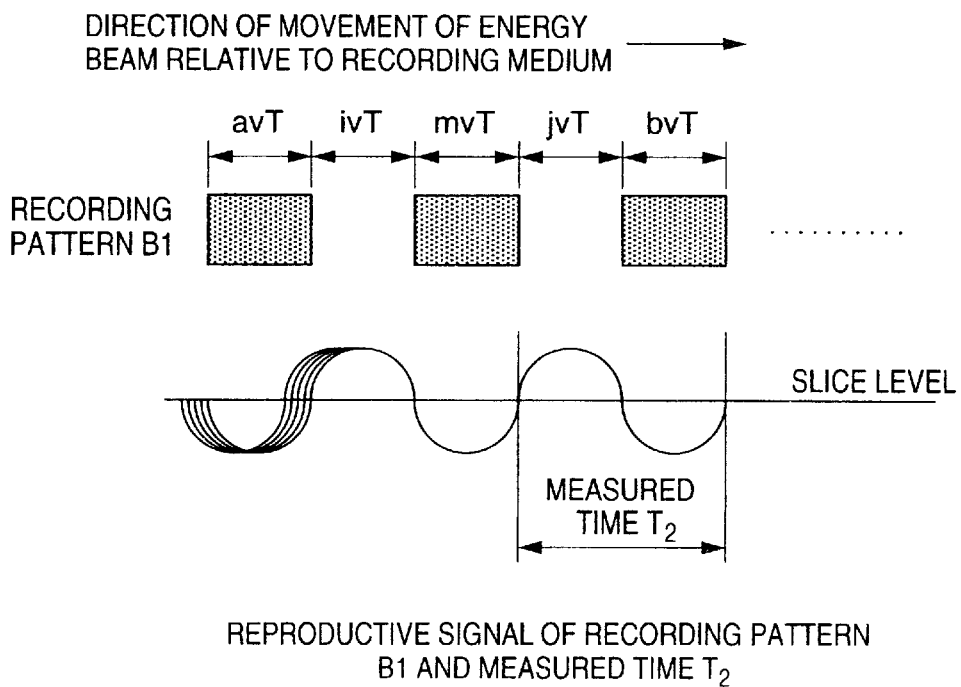

FIG. 6B shows a part of the recording pattern B1 depicted in FIG. 5B and a reproductive signal corresponding to the recording pattern B1. The time interval from the rear edge of the mvT-long mark (second mark) to the rear edge of the bvT-long mark (third mark) is measured from the reproductive signal by the time interval measurer. A result obtained by the measurement is set as measured time $T_2$. The fact that the measured time $T_2$ does not coincide with the time interval (j+b)T indicates the fact that the rear edge of the mvT-long mark (second mark) is not located in an appropriate position. In this manner, the position of the rear edge of the mvT-long mark (second mark) can be measured from the reproductive signal.

It is now important that the length of the ivT-long space (first space) preceding the mvT-long mark (second mark) changes variously. There is a fear that the irradiation with the energy beam for recording the avT-long mark (first mark) may cause the fluctuation of the rear edge position of the mvT-long mark (second mark). Further, the quantity of the fluctuation is also a function of the length of the ivT-long space (first space). Therefore, the length of the ivT-long space (first space) is changed variously so that an averaged quantity of the fluctuation is obtained. Accordingly, the measurement of the averaged rear edge position brings a technical effect that the mark edge position can be measured reliably even in the case where the rear edge position of the mvT-long mark (second mark) is made to fluctuate by the avT-long mark (first mark).

A method of accurately controlling the front and rear edges of any mark will be described below with reference to FIG. 1 in connection with a specific example of irradiation with the energy beam for forming marks and spaces.

When $T_{SFP}$ and $T_{ELP}$ are changed in accordance with the combination of the front and rear edges of the NRZI signal as described above in the information recording method according to the first embodiment of the present invention, the mark edge position can be always controlled accurately. However, grasping the present mark edge position accurately is inevitable for shifting the mark edge position to a predetermined place. Therefore, the recording pattern shown in FIGS. 5A and 5B is used so that the edge position is measured accurately by the edge position measuring method shown in FIGS. 6A and 6B. When the look-up tables for $T_{SFP}$ and $T_{ELP}$ are generated or corrected on the basis of the result of the edge position measurement, there is a technical effect that the recording can be performed reliably so that all edge positions are set in predetermined positions.

More specifically, when the value of one element in the front edge look-up table (for example, the value of an element in the look-up table in the case where the length of a mark (second mark) is MvT (in which M is a natural number) and the length of a space (first space) preceding the mark is IvT (in which "I" is a natural number)) is to be examined, the recording pattern A1 shown in FIG. 5B is formed using the basic recording patterns in which the values of parameters i and m for the small recording pattern A shown in FIG. 5A are made equal to "I" and M, respectively. The recording pattern A1 is recorded in the recording medium. Then, the time interval (measured time $T_1$) of the reproductive signal from the front edge of the avT-long mark (first mark) to the front edge of the MvT-long mark (second mark) is measured by the method shown in FIG. 6A. When the measured time $T_1$ is longer than the time interval (a+I)T, the numerical value of the element in the look-up table is reduced because the front edge of the MvT-long mark (second mark) is posterior to the predetermined position. That is, the value of $T_{SFP}$ shown in FIG. 1 is adjusted to be reduced so that the first pulse starts in earlier timing. When the measured time $T_1$ is contrariwise shorter than the time interval (a+I)T, the numerical value of the element in the look-up table is increased because the front edge of the MvT-long mark (second mark) is prior to the predetermined position. That is, the value of $T_{SFP}$ shown in FIG. 1 is adjusted to be increased so that the first pulse starts in later timing. By the aforementioned adjustment, the front edge position of the mark (second mark) can be brought to the predetermined position. When the aforementioned adjustment is applied to all elements in the front edge look-up table while the values of M and "I" are changed, there is a technical effect that the front edges can be always positioned in predetermined positions stably even in the case where any NRZI signal combination is given. As a result, the reliability of the information storage can be improved.

As another example, when the value of one element in the rear edge look-up table (for example, the value of an element in the look-up table in the case where the length of a mark (second mark) is MvT (in which M is a natural number) and the length of a space (second space) following the mark is JvT (in which J is a natural number)) is to be examined, the recording pattern B1 shown in FIG. 5B is formed using the basic recording patterns in which the values of parameter j and m for the small recording pattern A shown in FIG. 5A are made equal to J and M, respectively. The recording pattern B1 is recorded in the recording medium. Then, the time interval (measured time $T_2$) of the reproductive signal from the rear edge of the MvT-long mark (second mark) to the rear edge of the bvT-long mark (third mark) is measured by the method shown in FIG. 6B. When the measured time $T_2$ is longer than the time interval (b+J)T, the numerical value of the element in the look-up table is increased because the rear edge of the MvT-long mark (second mark) is prior to the predetermined position. That is, the value of $T_{ELP}$ shown in FIG. 1 is adjusted to be increased so that the last pulse ends in later timing. When the measured time $T_2$ is contrariwise shorter than the time interval (b+J)T, the numerical value of the element in the look-up table is reduced because the rear edge of the MvT-long mark (second mark) is posterior to the predetermined position. That is, the value of $T_{ELP}$ shown in FIG. 1 is adjusted to be reduced so that the last pulse ends in earlier timing. By the aforementioned adjustment, the rear edge position of the mark (second mark) can be brought to the predetermined position. When the aforementioned adjustment is applied to all elements in the rear edge look-up table while the values of M and J are changed, there is a technical effect that the rear edges can be always positioned in the predetermined positions stably even in the case where any NRZI signal combination is given. As a result, the reliability of the information storage can be improved.

An information recording apparatus according to the third embodiment of the present invention will be described below. The configuration of the information recording apparatus according to this embodiment is the same as that of the information recording apparatus according to the first embodiment of the present invention shown in FIG. 2. Accordingly, the operation of the information recording apparatus according to this embodiment will be described below with reference to FIG. 2.

When the necessity of writing information occurs or before the information writing occurs, the look-up tables for controlling the front and rear edges in the information writing mode may be optimized or updated. In this case, the system controller 150 sends the recording pattern A1 or B1 shown in FIG. 5B to the signal processing circuit 154 to form the recording mark string shown in FIGS. 5A and 5B in the recording medium 100. Then, the recording mark string is reproduced. The reproductive signal is two-valued by the slicer 170 and then sent to the time interval measuring circuit 171. The time interval measuring circuit 171 measures the time interval (measured time $T_1$) and the time interval (measured time $T_2$) shown in FIGS. 6A and 6B and sends the measurement results to the system controller 150. The system controller 150 updates the look-up tables in accordance with the aforementioned procedure on the basis of the measured time $T_1$ and the measured time $T_2$ received. Then, the system controller 150 sends the recording pattern A1 or B1 to the signal processing circuit 154 again to form a recording mark string in the recording medium 100 using the updated look-up tables.

In this manner, when the measurement of the measured time $T_1$ and the measured time $T_2$ and the updating of the look-up tables on the basis of the measured results thereof are repeated by the necessary number of times, the optimum look-up tables for writing information in the given recording medium 100 can be generated as occasion demands. Accordingly, there is a technical effect that information can be always written on the recording medium 100 stably and reliably.

Incidentally, a circuit having a time interval analyzer function may be considered as an example of the time interval measuring circuit 171. As another example, a first counter for counting the number of times when the distance between adjacent front edges is in a range of from $(a+i-0.5)T$ to $(a+i)T$ and a second counter for counting the number of times when the distance between adjacent front edges is in a range of from $(a+i)T$ to $(a+i+0.5)T$ may be provided for the measurement of the measured time $T_1$ shown in FIG. 6A. While the distance between the front edges of marks is always monitored, a judgment may be made from the difference between the frequency of the first counter and the frequency of the second counter as to whether the measured time $T_1$ is longer than the predetermined time $(a+i)T$ or not. That is, when the frequency of the first counter is higher than the frequency of the second counter, the judgment may be made that the measured time $T_1$ is shorter than the predetermined time $(a+i)T$. When the frequency of the first counter is contrariwise lower than the frequency of the second counter, the judgment may be made that the measured time $T_1$ is longer than the predetermined time $(a+i)T$. Further, a third counter for counting the number of times by which the distance between adjacent rear edges is in a range of from $(b+j-0.5)T$ to $(b+j)T$ and a fourth counter for counting the number of times by which the distance between adjacent rear edges is in a range of from $(b+j)T$ to $(b+j+0.5)T$ may be provided for the measurement of the measured time $T_2$ shown in FIG. 6B. While the distance between the rear edges of marks is always monitored, a judgment may be made from the difference between the frequency of the third counter and the frequency of the fourth counter as to whether the measured time $T_2$ is longer than the predetermined time $(b+j)T$ or not. That is, when the frequency of the third counter is higher than the frequency of the fourth counter, the judgment may be made that the measured time $T_2$ is shorter than the predetermined time $(b+j)T$. When the frequency of the third counter is contrariwise lower than the frequency of the fourth counter, the judgment may be made that the measured time $T_2$ is longer than the predetermined time $(b+j)T$. The configuration of the time measurement based on the comparison between the frequencies of the counters can be more simplified than the configuration of the time interval analyzer. Consequently, there is a technical effect that the reliability is high because the configuration is simple.

Figure 7A:
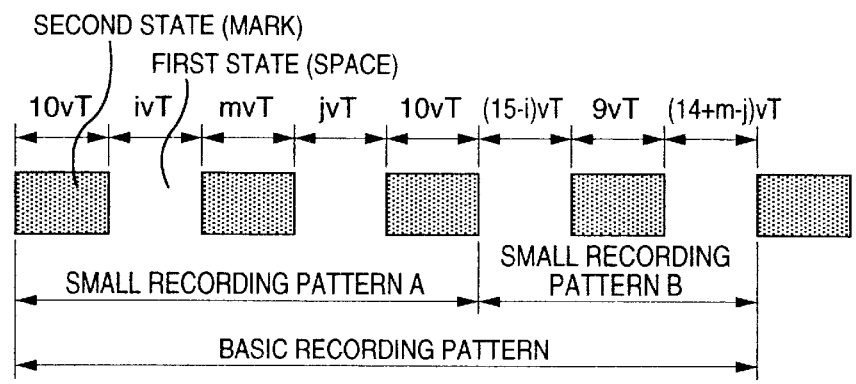
FIGS. 7A–7B are views showing specific examples of a basic recording pattern.
Figure 7B:
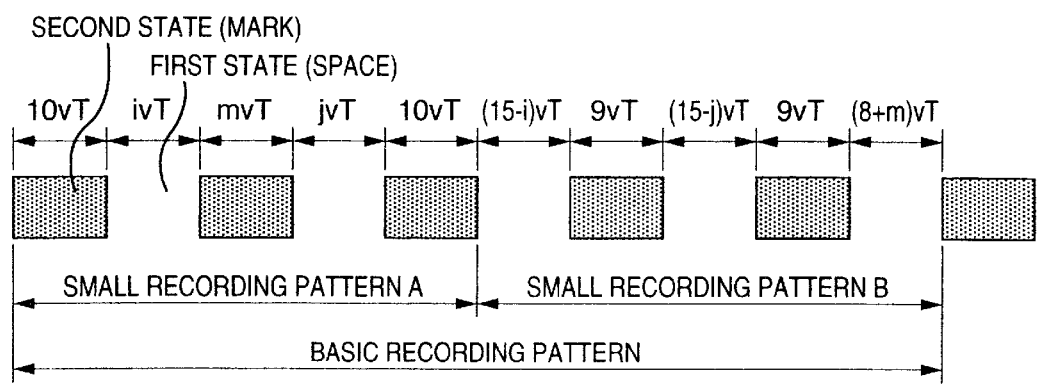

Specific examples of the recording mark string will be described below while the DVD-RAM is taken as an example. In the recording mark string, it is preferable that the DSV is zero. It is also preferable that any unnecessary mark edge interval is not mixed in the mark edge interval to be measured. Recording mark strings shown in FIGS. 7A and 7B are considered as specific examples of the recording mark string. In the two specific examples of the basic recording pattern shown in FIGS. 7A and 7B, it is assumed that each of parameters i, m and j is an integer in a range of from 3 to 6, inclusively. When the recording pattern A1 or B1 shown in FIG. 5B is formed using the aforementioned basic recording pattern, the DSV becomes zero and any unnecessary mark edge interval is prevented from overlapping the mark edge interval to be measured. Accordingly, there is a technical effect that the mark edge positions can be measured accurately.

The case where the recording patterns A1 and B1 shown in FIG. 5B are mixed will be described below while the DVD-RAM is taken as an example. It is prerequisite in this case that a recording pattern using the basic recording pattern shown in FIG. 7A or a recording pattern using the basic recording pattern shown in FIG. 7B is used. That is, in the basic recording pattern shown in FIG. 7B, parameters i and j are changed variously while parameter m is fixed so that a plurality of basic recording patterns are formed. The basic recording patterns are connected to one another to thereby form a recording pattern C. Incidentally, it is now assumed that the basic recording patterns in the recording pattern C contain all combinations of parameters i and j in the condition that each of the parameters i and j is in a range of from 3 to 6, inclusively.

FIG. 8 shows a specific example of the recording mark string formed in the aforementioned manner. This specific example is provided in the case of m=6. The numeral written in a quadrilateral frame indicates a parameter of the length of the mark. The actual length of the mark is obtained when the numeral written in the quadrilateral frame is multiplied by vT. Further, the numeral written outside the quadrilateral frame indicates a parameter of the length of the space. The actual length of the space is obtained when the numeral written outside the quadrilateral frame is multiplied by vT. As the mark-space string is long, it is expressed so as to be folded. The mark-space string is shown so that the mark-space string starts from a mark in the left upper corner of FIG. 8 and that marks and spaces are arranged alternately in the rightward direction in FIG. 8. A space at the right end of a line in FIG. 8 is followed by a mark at the left end of the next line. A space at the right end of the last line in FIG. 8 is the last in the recording pattern C. This recording pattern is recorded repeatedly by the necessary number of times. The recording pattern is reproduced.

The front edge interval is measured. The edge position to make the front edge interval near 13T is the front edge position of a 6T-long mark in the case where the length of a space preceding the mark is 3T. Further, the edge position to make the front edge interval near 14T is the front edge position of a 6T-long mark in the case where the length of a space preceding the mark is 4T. Further, the edge position to make the front edge interval near 15T is the front edge position of a 6T-long mark in the case where the length of a space preceding the mark is 5T. Further, the edge position to make the front edge interval near 16T is the front edge position of a 6T-long mark in the case where the length of a space preceding the mark is 6T.

The rear edge interval is also measured. The edge position to make the rear edge interval near 13T is the rear edge position of a 6T-long mark in the case where the length of a space following the mark is 3T. Further, the edge position to make the rear edge interval near 14T is the rear edge position of a 6T-long mark in the case where the length of a space following the mark is 4T. Further, the edge position to make the rear edge interval near 15T is the rear edge position of a 6T-long mark in the case where the length of a space following the mark is 5T. Further, the edge position to make the rear edge interval near 16T is the rear edge position of a 6T-long mark in the case where the length of a space following the mark is 6T.

When such a mark-space string as shown in FIGS. 7A and 7B is used as described above, the front and rear edges of the mark can be measured simultaneously on the basis of the repetition of the same recording pattern C. Further, the DSV is zero, so that the edge positions corresponding to the various combinations of the preceding and following spaces with respect to the given mark length can be measured all at once. Accordingly, there is a technical effect that the edge positions can be measured easily and accurately.

FIG. 9 shows a recording mark string in the case of m=5. The way of arranging the marks and the spaces is the same as in FIG. 8. This recording pattern is recorded repeatedly by the necessary number of times and then reproduced.

The front edge interval is measured. The edge position to make the front edge interval near 13T is the front edge position of a 5T-long mark in the case where the length of a space preceding the mark is 3T. Further, the edge position to make the front edge interval near 14T is the front edge position of a 5T-long mark in the case where the length of a space preceding the mark is 4T. Further, the edge position to make the front edge interval near 15T is the front edge position of a 5T-long mark in the case where the length of a space preceding the mark is 5T. Further, the edge position to make the front edge interval near 16T is the front edge position of a 5T-long mark in the case where the length of a space preceding the mark is 6T.

The rear edge interval is also measured. The edge position to make the rear edge interval near 13T is the rear edge position of a 5T-long mark in the case where the length of a space following the mark is 3T. Further, the edge position to make the rear edge interval near 14T is the rear edge position of a 5T-long mark in the case where the length of a space following the mark is 4T. Further, the edge position to make the rear edge interval near 15T is the rear edge position of a 5T-long mark in the case where the length of a space following the mark is 5T. Further, the edge position to make the rear edge interval near 16T is the rear edge position of a 5T-long mark in the case where the length of a space following the mark is 6T.

FIG. 10 shows a recording mark string in the case of m=4. The way of arranging the marks and the spaces is the same as in FIG. 8. This recording pattern is recorded repeatedly by the necessary number of times and then reproduced.

The front edge interval is measured. The edge position to make the front edge interval near 13T is the front edge position of a 4T-long mark in the case where the length of a space preceding the mark is 3T. Further, the edge position to make the front edge interval near 14T is the front edge position of a 4T-long mark in the case where the length of a space preceding the mark is 4T. Further, the edge position to make the front edge interval near 15T is the front edge position of a 4T-long mark in the case where the length of a space preceding the mark is 5T. Further, the edge position to make the front edge interval near 16T is the front edge position of a 4T-long mark in the case where the length of a space preceding the mark is 6T.

The rear edge interval is also measured. The edge position to make the rear edge interval near 13T is the rear edge position of a 4T-long mark in the case where the length of a space following the mark is 3T. Further, the edge position to make the rear edge interval near 14T is the rear edge position of a 4T-long mark in the case where the length of a space following the mark is 4T. Further, the edge position to make the rear edge interval near 15T is the rear edge position of a 4T-long mark in the case where the length of a space following the mark is 5T. Further, the edge position to make the rear edge interval near 16T is the rear edge position of a 4T-long mark in the case where the length of a space following the mark is 6T.

FIG. 11 shows a recording mark string in the case of m=3. The way of arranging the marks and the spaces is the same as in FIG. 8. This recording pattern is recorded repeatedly by the necessary number of times and then reproduced.

The front edge interval is measured. The edge position to make the front edge interval near 13T is the front edge position of a 3T-long mark in the case where the length of a space preceding the mark is 3T. Further, the edge position to make the front edge interval near 14T is the front edge position of a 3T-long mark in the case where the length of a space preceding the mark is 4T. Further, the edge position to make the front edge interval near 15T is the front edge position of a 3T-long mark in the case where the length of a space preceding the mark is 5T. Further, the edge position to make the front edge interval near 16T is the front edge position of a 3T-long mark in the case where the length of a space preceding the mark is 6T.

The rear edge interval is also measured. The edge position to make the rear edge interval near 13T is the rear edge position of a 3T-long mark in the case where the length of a space following the mark is 3T. Further, the edge position to make the rear edge interval near 14T is the rear edge position of a 3T-long mark in the case where the length of a space following the mark is 4T. Further, the edge position to make the rear edge interval near 15T is the rear edge position of a 3T-long mark in the case where the length of a space following the mark is 5T. Further, the edge position to make the rear edge interval near 16T is the rear edge position of a 3T-long mark in the case where the length of a space following the mark is 6T.

In the recording pattern described above with reference to FIGS. 8–11, the edge interval having the same length may be always measured irrespective of the value of m as follows. The edge interval of 13T is always measured when the length of the preceding/following space is 3T. The edge interval of 14T is always measured when the length of the preceding/following space is 4T. The edge interval of 15T is always measured when the length of the preceding/following space is 5T. The edge interval of 16T is always measured when the length of the preceding/following space is 6T. That is, only the measurement of the same edge interval which does not change irrespective of m is sufficient. Accordingly, there is a technical effect that the measurement is simplified and the edge positions can be detected easily and accurately.

A processing method for evaluating the edge positions by a simple circuit system on the basis of the recording pattern shown in FIGS. 8–11 will be described below. The following five kinds of counters are used for monitoring the distance between adjacent front edges. That is, there are used a first counter for counting the number of times by which the distance between the front edges is in a range of from a length of 11.5T to a length of 12.5T, a second counter for counting the number of times when the distance between the front edges is in a time range of from a length of 12.5T to a length of 13.5T, a third counter for counting the number of times when the distance between the front edges is in a time range of from a length of 13.5T to a length of 14.5T, a fourth counter for counting the number of times when the distance between the front edges is in a time range of from a length of 14.5T to a length of 15.5T and a fifth counter for counting the number of times when the distance between the front edges is in a time range of from a length of 15.5T to a length of 16.5T. The front edge position in the case where the length of the preceding space is 3T is estimated on the basis of the difference between the value of the first counter and the value of the second counter. The front edge position in the case where the length of the preceding space is 4T is estimated on the basis of the difference between the value of the second counter and the value of the third counter. The front edge position in the case where the length of the preceding space is 5T is estimated on the basis of the difference between the value of the third counter and the value of the fourth counter. The front edge position in the case where the length of the preceding space is 6T is estimated on the basis of the difference between the value of the fourth counter and the value of the fifth counter.

Then, the distance between adjacent rear edges is monitored so that the edge intervals are measured by use of the aforementioned first, second, third, fourth and fifth counters. The rear edge position in the case where the length of the following space is 3T is estimated on the basis of the difference between the value of the first counter and the value of the second counter. The rear edge position in the case where the length of the following space is 4T is estimated on the basis of the difference between the value of the second counter and the value of the third counter. The rear edge position in the case where the length of the following space is 5T is estimated on the basis of the difference between the value of the third counter and the value of the fourth counter. The rear edge position in the case where the length of the following space is 6T is estimated on the basis of the difference between the value of the fourth counter and the value of the fifth counter.

The use of the aforementioned configuration brings a technical effect that the look-up tables for controlling the mark edge positions can be determined accurately in accordance with all combinations of the front and rear edges of the NRZI signal when the five kinds of simple counters are prepared.

Although the basic recording pattern shown in FIG. 7B is used in the description with reference to FIGS. 8–11, the same effect as described above can be obtained also in the case where the basic recording pattern shown in FIG. 7A is used for forming a recording mark string in the same manner as described in FIGS. 8–11. In this case, there is a technical effect that the total number of the marks and spaces is reduced, so that the recording pattern is generated easily.

As described above, according to the present invention, the recording mark edges can be always positioned in the predetermined positions stably even in the case where the high-density recording is performed so that the shortest recording mark length is not larger than the radius of the recording spot. Accordingly, there is a technical effect that information can be always recorded on the recording medium stably and reliably.

What is claimed is:

1. An information recording method using a recording medium permitted to get into a first state by a first power level of an energy beam and permitted to get into a second state by a second power level of said energy beam higher than said first power level, for recording information on said recording medium by moving said energy beam and said recording medium relatively to each other so that said recording medium is irradiated with said energy beam and said first and second states are formed on said recording medium with predetermined lengths and at predetermined intervals, comprising the steps of:

when a period of a recording timing generating clock in a recording mode is T, and a relative velocity of said energy beam and said recording medium is v, forming a sequence of said second state with length avT (first mark), said first state with length ivT (first space) following said first mark, said second state with length mvT (second mark) following said first space, said first state with length jvT (second space) following said second mark and said second state with length bvT (third mark) following said second space as a first small recording pattern;

forming a sequence which starts with said first state and ends with said first state while said first and second states appear alternately by a finite number of times, as a second small recording pattern;

forming a state in which said second small recording pattern follows said first small recording pattern, as a basic recording pattern;

forming a state in which said basic recording patterns are repeated, as a recording pattern;

forming said recording pattern which comprises said basic recording patterns obtained by changing a parameter j variously while parameters a, i and m are fixed, as a first recording pattern, said parameters a, i, m and j being natural numbers;

forming said recording pattern which comprises said basic recording patterns obtained by changing said parameter i variously while a parameter b and said parameters j and m are fixed, as a second recording pattern, said parameter b being a natural number; and using at least one of first and second edge position measuring methods, wherein:

said first edge position measuring method estimates a position of a boundary between said second mark and said first space by comparing a time interval from time corresponding to a mark edge position opposite to said first space of said first mark in a read signal of said first recording pattern to time corresponding to the position of the boundary between said second mark and said first space in said read signal with a time interval of (a+i)T; and said second edge position measuring method estimates a position of a boundary between said second mark and said second space by comparing a time interval from time corresponding to the position of the boundary between said second mark and said second space in a read signal of said second recording pattern to time corresponding to a mark edge position opposite to said second space of said third mark in said read signal with a time interval of (b+i)T.

2. An information recording method according to claim 1, wherein:

said parameter a is set to be equal to 10 and said parameter b is set to be equal to 10;

each of said parameters $\underline{i}$, $\underline{j}$ and $\underline{m}$ is set to be a natural number from 3 to 6, inclusively; and said second small recording pattern comprises said first state with length $(15-i)vT$, said following second state with length $9vT$ and said following first state with length $(14+m-j)vT$.

3. An information recording method according to claim 1, wherein:

said parameter $\underline{a}$ is set to be equal to 10 and said parameter $\underline{b}$ is set to be equal to 10;

each of said parameters $\underline{i}$, $\underline{j}$ and $\underline{m}$ is set to be a natural number from 3 to 6, inclusively; and said second small recording pattern comprises said first state with length $(15-i)vT$, said following second state with length $9vT$, said following first state with length $(15-j)vT$, said following second state with length $9vT$ and said following first state with length $(8+m)vT$.

4. An information recording method using a recording medium permitted to get into a first state by a first power level of an energy beam and permitted to get into a second state by a second power level of said energy beam higher than said first power level, for recording information on said recording medium by moving said energy beam and said recording medium relatively to each other so that said recording medium is irradiated with said energy beam and said first and second states are formed on said recording medium with predetermined lengths and at predetermined intervals, comprising the steps of:

when a period of a recording timing generating clock in a recording mode is T, and a relative velocity of said energy beam and said recording medium is v, forming a sequence of said second state with length $avT$ (first mark), said first state with length $ivT$ (first space) following said first mark, said second state with length $mvT$ (second mark) following said first space, said first state with length $jvT$ (second space) following said second mark and said second state with length $bvT$ (third mark) following said second space as a first small recording pattern;

forming a sequence which starts with said first state and ends with said first state while said first and second states appear alternately by a finite number of times, as a second small recording pattern;

forming a state in which said second small recording pattern follows said first small recording pattern, as a basic recording pattern;

forming a state in which said basic recording patterns are repeated, as a recording pattern;

forming said recording pattern which comprises said basic recording patterns obtained by changing a parameter $\underline{j}$ variously while parameters $\underline{a}$, $\underline{i}$ and $\underline{m}$ are fixed, as a first recording pattern, said parameters $\underline{a}$, $\underline{i}$, $\underline{m}$ and $\underline{j}$ being natural numbers;

forming said recording pattern which comprises said basic recording patterns obtained by changing said parameter $\underline{i}$ variously while a parameter $\underline{b}$ and said parameters $\underline{j}$ and $\underline{m}$ are fixed, as a second recording pattern, said parameter $\underline{b}$ being a natural number;

using at least one of first and second edge position measuring methods; and using at least one of first and second timing adjusting methods, wherein said first edge position measuring method estimates a position of a boundary between said second mark and said first space by comparing a time interval from time corresponding to a mark edge position opposite to said first space of said first mark in a read signal of said first recording pattern to time corresponding to the position of the boundary between said second mark and said first space in said read signal with a time interval of $(a+i)T$;

said second edge position measuring method estimates a position of a boundary between said second mark and said second space by comparing a time interval from time corresponding to the position of the boundary between said second mark and said second space in a read signal of said second recording pattern to time corresponding to a mark edge position opposite to said second space of said third mark in said read signal with a time interval of $(b+i)T$;

said first timing adjusting method changes timing for making said energy beam reach said second power level in accordance with a combination of the respective lengths of said first and second states to be formed on said recording medium; and said second timing adjusting method changes timing for shifting said energy beam from said second power level to another energy level in accordance with a combination of the respective lengths of said second and first states to be formed on said recording medium.

5. An information recording method according to claim 4, wherein:

said parameter $\underline{a}$ is set to be equal to 10 and said parameter $\underline{b}$ is set to be equal to 10;

each of said parameters $\underline{i}$, $\underline{j}$ and $\underline{m}$ is set to be a natural number from 3 to 6, inclusively; and said second small recording pattern comprises said first state with length $(15-i)vT$, said following second state with length $9vT$ and said following first state with length $(14+m-j)vT$.

6. An information recording method according to claim 4, wherein:

said parameter $\underline{a}$ is set to be equal to 10 and said parameter $\underline{b}$ is set to be equal to 10;

each of said parameters $\underline{i}$, $\underline{j}$ and $\underline{m}$ is set to be a natural number from 3 to 6, inclusively; and said second small recording pattern comprises said first state with length $(15-i)vT$, said following second state with length $9vT$, said following first state with length $(15-j)vT$, said following second state with length $9vT$ and said following first state with length $(8+m)vT$.

7. An information recording method using a recording medium permitted to get into a first state by a first power level of an energy beam and permitted to get into a second state by a second power level of said energy beam higher than said first power level, for recording information on said recording medium by moving said energy beam and said recording medium relatively to each other so that said recording medium is irradiated with said energy beam and said first and second states are formed on said recording medium with predetermined lengths and at predetermined intervals, comprising the steps of:

when a period of a recording timing generating clock in a recording mode is T, and a relative velocity of said energy beam and said recording medium is v, forming a sequence of said second state with length $avT$ (first mark), said first state with length $ivT$ (first space) following said first mark, said second state with length $mvT$ (second mark) following said first space, said first state with length $jvT$ (second space) following said second mark and said second state with length bvT (third mark) following said second space as a first small recording pattern;

forming a sequence which starts with said first state and ends with said first state while said first and second states appear alternately by a finite number of times, as a second small recording pattern;

forming a state in which said second small recording pattern follows said first small recording pattern, as a basic recording pattern;

forming a state in which said basic recording patterns are repeated, as a recording pattern;

forming said recording pattern which comprises said basic recording patterns obtained by changing a parameter j variously while parameters a, i and m are fixed, as a first recording pattern, said parameters a, i, m and j being natural numbers;

forming said recording pattern which comprises said basic recording patterns obtained by changing said parameter i variously while a parameter b and said parameters j and m are fixed, as a second recording pattern, said parameter b being a natural number;

using at least one of first and second edge position measuring methods;

using at least one of first and second timing adjusting methods; and using at least one of first and second timing correcting methods, wherein said first edge position measuring method estimates a position of a boundary between said second mark and said first space by comparing a time interval from time corresponding to a mark edge position opposite to said first space of said first mark in a read signal of said first recording pattern to time corresponding to the position of the boundary between said second mark and said first space in said read signal with a time interval of (a+i)T;

said second edge position measuring method estimates a position of a boundary between said second mark and said second space by comparing a time interval from time corresponding to the position of the boundary between said second mark and said second space in a read signal of said second recording pattern to time corresponding to a mark edge position opposite to said second space of said third mark in said read signal with a time interval of (b+i)T;

said first timing adjusting method changes timing for making said energy beam reach said second power level in accordance with a combination of the respective lengths of said first and second states to be formed on said recording medium;

said second timing adjusting method changes timing for shifting said energy beam from said second power level to another energy level in accordance with a combination of the respective lengths of said second and first states to be formed on said recording medium;

said first timing correcting method adjusts the timing in said first timing adjusting method based on a result of said first edge position measuring method; and said second timing correcting method adjusts the timing in said second timing adjusting method based on a result of said second edge position measuring method.

8. An information recording method according to claim 7, wherein:

said parameter a is set to be equal to 10 and said parameter b is set to be equal to 10;

each of said parameters i, j and m is set to be a natural number from 3 to 6, inclusively; and said second small recording pattern comprises said first state with length (15−i)vT, said following second state with length 9vT and said following first state with length (14+m−j)vT.

9. An information recording method according to claim 7, wherein:

said parameter a is set to be equal to 10 and said parameter b is set to be equal to 10;

each of said parameters i, j and m is set to be a natural number from 3 to 6, inclusively; and said second small recording pattern comprises said first state with length (15−i)vT, said following second state with length 9vT, said following first state with length (15−j)vT, said following second state with length 9vT and said following first state with length (8+m)vT.

10. A recording medium permitted to get into a first state by a first power level of an energy beam and permitted to get into a second state by a second power level of said energy beam higher than said first power level, wherein at least one of information of timing for making said energy beam to reach said second power level and information of timing for shifting said power level from said second power level into another energy level both of which are determined using said information recording method according to claim 7 is recorded as not-rewritable information on said information recording medium.

11. An information recording apparatus comprising:

an energy beam generator for generating an energy beam;

a power adjusting mechanism for setting a power level of said energy beam to a first power level and a second power level which is higher than said first power level;

a holding mechanism for holding a recording medium permitted to get into a first state by said first power level and permitted to get into a second state by said second power level;

a moving mechanism for moving said energy beam and said recording medium relatively to each other;

a positioning mechanism for irradiating a predetermined place of said recording medium with said energy beam; and a signal processing circuit for changing information to be recorded, into said power levels of said energy beam, wherein said information recording apparatus uses the information recording medium according to claim 10, and said apparatus further comprises:

means for reading said not-rewritable information recorded on said information recording medium to thereby decode at least one of the information of timing for making said energy beam to reach said second power level and the information of timing for shifting said power level from said second power level into another energy level; and means for modulating energy pulses in accordance with the decoded information of timing when said second states is formed on said recording medium.

12. An information recording method using a recording medium permitted to get into a first state by a first power level of an energy beam and permitted to get into a second state by a second power level of said energy beam higher than said first power level, for recording information on said recording medium by moving said energy beam and said recording medium relatively to each other so that said recording medium is irradiated with said energy beam and said first and second states are formed on said recording medium with predetermined lengths and at predetermined intervals, comprising the steps of:

when a period of a recording timing generating clock in a recording mode is T, and a relative velocity of said energy beam and said recording medium is v, forming a sequence of said second state with length avT (first mark), said first state with length ivT (first space) following said first mark, said second state with length mvT (second mark) following said first space, said first state with length jvT (second space) following said second mark and said second state with length bvT (third mark) following said second space as a first small recording pattern;

forming a sequence which starts with said first state and ends with said first state while said first and second states appear alternately by a finite number of times, as a second small recording pattern;

forming a state in which said second small recording pattern follows said first small recording pattern, as a basic recording pattern;

forming a state in which said basic recording patterns are repeated, as a recording pattern;

forming said recording pattern which comprises said basic recording patterns obtained by changing a parameter j variously while parameters a, i and m are fixed, as a first recording pattern, said parameters a, i, m and j being natural numbers;

forming said recording pattern which comprises said basic recording patterns obtained by changing said parameter i variously while a parameter b and said parameters j and m are fixed, as a second recording pattern, said parameter b being a natural number;

using at least one of first and second edge position measuring methods;

using at least one of first and second timing adjusting methods; and using at least one of first and second timing correcting methods, wherein said first edge position measuring method estimates a position of a boundary between said second mark and said first space by comparing a time interval from time corresponding to a mark edge position opposite to said first space of said first mark in a read signal of said first recording pattern to time corresponding to the position of the boundary between said second mark and said first space in said read signal with a time interval of (a+i)T;

said second edge position measuring method estimates a position of a boundary between said second mark and said second space by comparing a time interval from time corresponding to the position of the boundary between said second mark and said second space in a read signal of said second recording pattern to time corresponding to a mark edge position opposite to said second space of said third mark in said read signal with a time interval of (b+i)T;

said first timing adjusting method changes timing for making said energy beam reach said second power level in accordance with a combination of the respective lengths of said first and second states to be formed on said recording medium;

said second timing adjusting method changes timing for shifting said energy beam from said second power level to another energy level in accordance with a combination of the respective lengths of said second and first states to be formed on said recording medium;

said first timing correcting method operates so that in a case where said first edge position measuring method concludes that the time interval from the time corresponding to the mark edge position opposite to said first space of said first mark in the read signal of said first recording pattern to the time corresponding to the position of the boundary between said second mark and said first space in said read signal is loner than the time interval of (a+i)T, timing of arrival at said second power level for forming said second state with length mT is quickened only when said second state with length mT is to be formed so as to follow said first state with length iT by said first timing adjusting method; and in a case where said first edge position measuring method concludes that the time interval from the time corresponding to the mark edge position opposite to said first space of said first mark in the read signal of said first recording pattern to the time corresponding to the position of the boundary between said second mark and said first space in said read signal is shorter than the time interval of (a+i)T, the timing of arrival at said second power level for forming said second state with length mT is delayed only when said second state with length mT is to be formed so as to follow said first state with length iT by said first timing adjusting method, and said second timing correcting method operates so that in a case where said second edge position measuring method concludes that the time interval from the time corresponding to the position of the boundary between said second mark and said second space in the read signal of said second recording pattern to the time corresponding to the mark edge position opposite to said second space of said third mark in said read signal is loner than the time interval of (b+j)T, timing of shifting from said second power level to another energy level for forming said second state with length mT is delayed only when said first state with length jT is to be formed so as to follow said second state with length mT by said second timing adjusting method; and in a case where said second edge position measuring method concludes that the time interval from the time corresponding to the position of the boundary between said second mark and said second space in the read signal of said second recording pattern to the time corresponding to the mark edge position opposite to said second space of said third mark in said read signal is shorter than the time interval of (b+j)T, the timing of shifting from said second power level to another energy level for forming said second state with length mT is quickened only when said first state with length jT is to be formed so as to follow said second state with length mT by said second timing adjusting method.

13. An information recording method according to claim 12, wherein:

said parameter a is set to be equal to 10 and said parameter b is set to be equal to 10;

each of said parameters i, j and m is set to be a natural number from 3 to 6, inclusively; and said second small recording pattern comprises said first state with length (15−i)vT, said following second state with length 9vT and said following first state with length (14+m−j)vT.

14. An information recording method according to claim 12, wherein:
said parameter a is set to be equal to 10 and said parameter b is set to be equal to 10;
each of said parameters i, j and m is set to be a natural number from 3 to 6, inclusively; and
said second small recording pattern comprises said first state with length (15−i)vT, said following second state with length 9vT, said following first state with length (15−j)vT, said following second state with length 9vT and said following first state with length (8+m)vT.

15. A recording medium permitted to get into a first state by a first power level of an energy beam and permitted to get into a second state by a second power level of said energy beam higher than said first power level, wherein
at least one of information of timing for making said energy beam to reach said second power level and information of timing for shifting said power level from said second power level into another energy level both of which are determined using said information recording method according to claim 12 is recorded as not-rewritable information on said information recording medium.

16. An information recording apparatus comprising:
an energy beam generator for generating an energy beam;
a power adjusting mechanism for setting a power level of said energy beam to a first power level and a second power level which is higher than said first power level;
a holding mechanism for holding a recording medium permitted to get into a first state by said first power level and permitted to get into a second state by said second power level;
a moving mechanism for moving said energy beam and said recording medium relatively to each other;
a positioning mechanism for irradiating a predetermined place of said recording medium with said energy beam; and
a signal processing circuit for changing information to be recorded, into said power levels of said energy beam, wherein
said information recording apparatus uses the information recording medium according to claim 15, and
said apparatus further comprises:
means for reading said not-rewritable information recorded on said information recording medium to thereby decode at least one of the information of timing for making said energy beam to reach said second power level and the information of timing for shifting said power level from said second power level into another energy level; and
means for modulating energy pulses in accordance with the decoded information of timing when said second states is formed on said recording medium.

17. An information recording apparatus comprising:
an energy beam generator for generating an energy beam;
a power adjusting mechanism for setting a power level of said energy beam to a first power level and a second power level which is higher than said first power level;
a holding mechanism for holding a recording medium permitted to get into a first state by said first power level and permitted to get into a second state by said second power level;
a moving mechanism for moving said energy beam and said recording medium relatively to each other;
a positioning mechanism for irradiating a predetermined place of said recording medium with said energy beam; and
a signal processing circuit for changing information to be recorded, into said power levels of said energy beam; and
means for executing at least one of said first and second timing correcting methods according to claim 7 or at least one of said first and second timing correcting methods according to claim 12.

* * * * *